(12) United States Patent
Xing et al.

(10) Patent No.: US 11,507,626 B2
(45) Date of Patent: Nov. 22, 2022

(54) METHOD AND APPARATUS FOR PROCESSING DATABASE CONFIGURATION PARAMETER, COMPUTER DEVICE, AND STORAGE MEDIUM

(71) Applicant: TENCENT TECHNOLOGY (SHENZHEN) COMPANY LIMITED, Guangdong (CN)

(72) Inventors: Jia Shu Xing, Shenzhen (CN); Ji Zhang, Shenzhen (CN)

(73) Assignee: TENCENT TECHNOLOGY (SHENZHEN) COMPANY LTD, Shenzhen (CN)

(*) Notice: Subject to any disclaimer, the term of this patent is extended or adjusted under 35 U.S.C. 154(b) by 243 days.

(21) Appl. No.: 17/004,321

(22) Filed: Aug. 27, 2020

(65) Prior Publication Data
US 2020/0394226 A1 Dec. 17, 2020

Related U.S. Application Data

(63) Continuation of application No. PCT/CN2019/082226, filed on Apr. 11, 2019.

(30) Foreign Application Priority Data

May 22, 2018 (CN) .......................... 201810494412.3

(51) Int. Cl.
*G06F 16/9035* (2019.01)
*G06F 16/903* (2019.01)
(Continued)

(52) U.S. Cl.
CPC ...... *G06F 16/9035* (2019.01); *G06F 9/44505* (2013.01); *G06F 16/90335* (2019.01); *G06N 3/0454* (2013.01); *G06N 3/08* (2013.01)

(58) Field of Classification Search
CPC ........... G06F 16/9035; G06F 16/90335; G06F 9/44505; G06N 3/0454; G06N 3/08
(Continued)

(56) References Cited

U.S. PATENT DOCUMENTS

| 5,852,818 A | 12/1998 | Guay et al. |
| 2005/0066155 A1* | 3/2005 | Dutt ...................... H04L 67/125 713/1 |

(Continued)

FOREIGN PATENT DOCUMENTS

| CN | 101072048 A | 11/2007 |
| CN | 101841423 A | 9/2010 |

(Continued)

OTHER PUBLICATIONS

Aken et al., "Automatic Database Management System Tuning Through Large-scale Machine Learning", May 2017, SIGMOD '17: Proceedings of the 2017 ACM International Conference on Management of Data, pp. 1009-1024 (Year: 2017).*

(Continued)

*Primary Examiner* — Hosain Talam
*Assistant Examiner* — Robert F May
(74) *Attorney, Agent, or Firm* — Sughrue Mion, PLLC

(57) ABSTRACT

A method of processing a database configuration parameter, performed by a computer device, is provided. The method includes: (a) obtaining a current configuration parameter of a database; (b) determining a current database state indicator value corresponding to the current configuration parameter; (c) generating, by using a parameter adjustment model, parameter adjustment data based on the current database state indicator value; (d) adjusting the current configuration parameter based on the parameter adjustment data, to obtain a new configuration parameter; (e) updating the current configuration parameter to the new configuration parameter;

(Continued)

and (f) repeating operations (b)-(e) until an adjustment termination condition is met, to obtain the updated current configuration parameter as a recommended configuration parameter upon adjustment termination.

18 Claims, 8 Drawing Sheets

(51) Int. Cl.
  *G06F 9/445* (2018.01)
  *G06N 3/04* (2006.01)
  *G06N 3/08* (2006.01)
(58) Field of Classification Search
  USPC .................................................... 707/722
  See application file for complete search history.

(56) References Cited

U.S. PATENT DOCUMENTS

| | | | |
|---|---|---|---|
| 2006/0136358 | A1 | 6/2006 | Sonkin et al. |
| 2008/0319933 | A1* | 12/2008 | Moussa .................. G06N 3/084 706/31 |
| 2014/0214735 | A1* | 7/2014 | Harik ...................... G06N 5/04 706/12 |
| 2015/0170053 | A1* | 6/2015 | Miao ...................... G06N 20/00 706/12 |
| 2017/0156018 | A1 | 6/2017 | Li |
| 2020/0111018 | A1* | 4/2020 | Golovin .............. G06F 11/3409 |

FOREIGN PATENT DOCUMENTS

| | | |
|---|---|---|
| CN | 103853786 A | 6/2014 |
| CN | 105354658 A | 2/2016 |
| CN | 107026747 A | 8/2017 |
| CN | 107908532 A | 4/2018 |
| CN | 108763398 A | 11/2018 |

OTHER PUBLICATIONS

Karanam et al., "Analysis of Fuzzy with Neuro-Fuzzy Approach to Self-Tune Database System", 2017, 2017 International Conference on Nascent Technologies in Engineering (ICNTE) (Year: 2017).*
Dana Van Aken et al., "Automatic Database Management System Tuning Through Large-scale Machine Learning", Proceedings of the 2017 ACM International Conference on Management of Data , SIGMOD '17, Jan. 1, 2017 (Jan. 1, 2017), pp. 1009-1024, XP055479043 (16 pages total).
Songyun Duan et al., "Tuning database configuration parameters with iTuned", Proceedings of the VLDB Endowment; [ACM Digital Library], Assoc. of Computing Machinery, vol. 2, No. 1, Aug. 1, 2009, pp. 1246-1257, XP058332783 (12 pages total).
Extended European Search Report dated Feb. 8, 2021 from the European Patent Office in EP Application No. 19807040.1.
Communication dated Feb. 25, 2021 from the European Patent Office in EP Application No. 19807040.1.
First Office Action of Chinese Application No. 201810494412.3 dated May 6, 2020.
International Search Report of PCT/CN2019/082226 dated Jul. 12, 2019 [PCT/ISA/210].
Written Opinion of PCT/CN2019/082226 dated Jul. 12, 2019 [PCT/ISA/237].
Written Opinion dated Jul. 12, 2019 in International Application No. PCT/CN2019/082226.

* cited by examiner

METHOD AND APPARATUS FOR PROCESSING DATABASE CONFIGURATION PARAMETER, COMPUTER DEVICE, AND STORAGE MEDIUM

CROSS-REFERENCE TO RELATED APPLICATION(S)

This application is a bypass continuation application of International Application No. PCT/CN2019/082226, filed on Apr. 11, 2019, which claims priority to Chinese Patent Application No. 201810494412.3, entitled "DATABASE CONFIGURATION PARAMETER PROCESSING METHOD AND APPARATUS, COMPUTER DEVICE, AND STORAGE MEDIUM" and filed with the China National Intellectual Property Administration on May 22, 2018, the disclosures of which are herein incorporated by reference in their entireties.

FIELD

The disclosure relates to the field of computer technologies, and in particular, to a method and an apparatus for processing a database configuration parameter, a computer device, and a storage medium.

BACKGROUND

With the rapid development of computer technologies, a data processing capability of a computer is greatly improved, and a volume of data processed by a database also increases. Therefore, there are new requirements for database performance, and performance optimization of a database can be ensured by configuring the database by using only an optimal configuration parameter.

However, in a process of determining the optimal configuration parameter of the database, the related art technology is to obtain the optimal configuration parameter by sampling configuration parameters and testing the optimal configuration parameter obtained through sampling. However, the optimal configuration parameter obtained through sampling has low accuracy.

SUMMARY

One or more example embodiments provide an apparatus and a method for processing a database configuration parameter, a computer device, and a storage medium that solve the problem in the related art technology that an optimal configuration parameter generated or obtained has low accuracy.

According to an aspect of an embodiment, there is provided a method of processing a database configuration parameter, performed by a computer device, the method including:
- (a) obtaining a current configuration parameter of a database;
- (b) determining a current database state indicator value corresponding to the current configuration parameter;
- (c) generating, by using a parameter adjustment model, parameter adjustment data based on the current database state indicator value;
- (d) adjusting the current configuration parameter based on the parameter adjustment data, to obtain a new configuration parameter;
- (e) updating the current configuration parameter to the new configuration parameter; and
- (f) repeating operations (b)-(e) until an adjustment termination condition is met, to obtain the updated current configuration parameter as a recommended configuration parameter upon adjustment termination.

According to an aspect of an embodiment, provided is a database parameter configuration method, performed by a terminal, the method including:
- entering a database parameter configuration page by using a current user account;
- obtaining a parameter adjustment instruction triggered in the database parameter configuration page; and
- transmitting the parameter adjustment instruction to a server, the parameter adjustment instruction being used for instructing the server to obtain a current configuration parameter of a database corresponding to the user account, determine a current database state indicator value corresponding to the current configuration parameter, generate parameter adjustment data through a parameter adjustment model according to the current database state indicator value, adjust the current configuration parameter according to the parameter adjustment data, to obtain a new configuration parameter, use the new configuration parameter as a current configuration parameter, and return to the determining a current database state indicator value corresponding to the current configuration parameter to continue execution until an adjustment termination condition is met, to obtain a recommended configuration parameter.

According to an aspect of an embodiment, provided is a database configuration parameter processing apparatus, including:
- at least one memory configured to store program code; and
- at least one processor configured to read the program code and operate as instructed by the program code, the program code including:
  - current parameter obtaining code configured to cause at least one of the at least one processor to obtain a current configuration parameter of a database;
  - state indicator determining code configured to cause at least one of the at least one processor to determine a current database state indicator value corresponding to the current configuration parameter;
  - adjustment data generation code configured to cause at least one of the at least one processor to generate parameter adjustment data through a parameter adjustment model according to the current database state indicator value;
  - current parameter adjustment code configured to cause at least one of the at least one processor to adjust the current configuration parameter according to the parameter adjustment data, to obtain a new configuration parameter; and
  - recommended parameter obtaining code configured to cause at least one of the at least one processor to update the current configuration parameter to the new configuration parameter, and cause operations of the state indicator determining code, the adjustment data generation code, and the current parameter adjustment code to be performed until an adjustment termination condition is met, to obtain the updated current configuration parameter as a recommended configuration parameter upon adjustment termination.

According to an aspect of an embodiment, provided is a database parameter configuration apparatus, including:
at least one memory configured to store program code; and
at least one processor configured to read the program code and operate as instructed by the program code, the program code including:
configuration page entering code configured to cause at least one of the at least one processor to enter a database parameter configuration page by using a current user account;
adjustment instruction obtaining code configured to cause at least one of the at least one processor to obtain a parameter adjustment instruction triggered in the database parameter configuration page; and
adjustment instruction transmitting code configured to cause at least one of the at least one processor to transmit the parameter adjustment instruction to a server, the parameter adjustment instruction being used for instructing the server to obtain a current configuration parameter of a database corresponding to the user account, determine a current database state indicator value corresponding to the current configuration parameter, generate parameter adjustment data through a parameter adjustment model according to the current database state indicator value, adjust the current configuration parameter according to the parameter adjustment data, to obtain a new configuration parameter, use the new configuration parameter as a current configuration parameter, and return to the determining a current database state indicator value corresponding to the current configuration parameter to continue execution until an adjustment termination condition is met, to obtain a recommended configuration parameter.

A computer device, including a memory and a processor, the memory storing a computer program, the computer program, when being executed by the processor, causing the processor to perform the following operations:
obtaining a current configuration parameter;
determining a current database state indicator value corresponding to the current configuration parameter;
generating parameter adjustment data through a parameter adjustment model according to the current database state indicator value;
adjusting the current configuration parameter according to the parameter adjustment data, to obtain a new configuration parameter; and
using the new configuration parameter as a current configuration parameter, and returning to the determining a current database state indicator value corresponding to the current configuration parameter to continue execution until an adjustment termination condition is met, to obtain a recommended configuration parameter.

A storage medium, storing a computer program, the computer program, when being executed by a processor, causing the processor to perform the following operations:
obtaining a current configuration parameter;
determining a current database state indicator value corresponding to the current configuration parameter;
generating parameter adjustment data through a parameter adjustment model according to the current database state indicator value;
adjusting the current configuration parameter according to the parameter adjustment data, to obtain a new configuration parameter; and
using the new configuration parameter as a current configuration parameter, and returning to the determining a current database state indicator value corresponding to the current configuration parameter to continue execution until an adjustment termination condition is met, to obtain a recommended configuration parameter.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

To make objectives, technical solutions, and advantages of the disclosure clearer and more understandable, the disclosure is further described in detail below with reference to the accompanying drawings and the embodiments. It is to be understood that the specific embodiments described herein are only used for explaining the disclosure, and are not used for limiting the disclosure.

Figure 1:
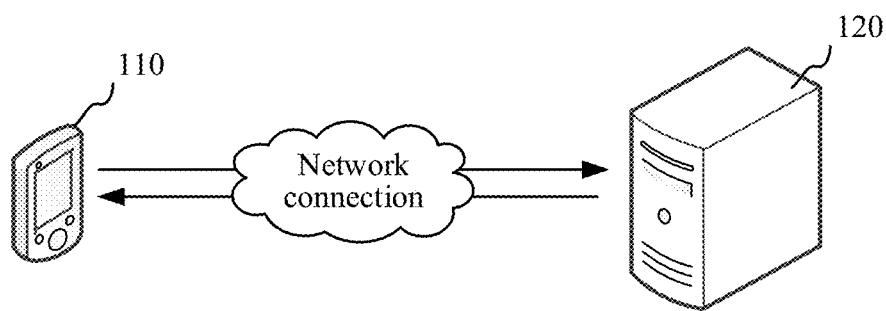
FIG. 1 is a diagram of an application scenario of a database configuration parameter processing method in an embodiment.

FIG. 1 is a diagram of an application scenario of a database configuration parameter processing method in an embodiment. Referring to FIG. 1, the application scenario includes a user terminal 110 and a server 120, and the user terminal 110 performs data exchange with the server 120 through a network connection. The user terminal 110 may be a desktop user terminal or a mobile user terminal, and the mobile user terminal may be, for example, at least one of a mobile phone, a tablet computer, a notebook computer, and the like. The server 120 may be a single server or a server cluster.

Figure 2:
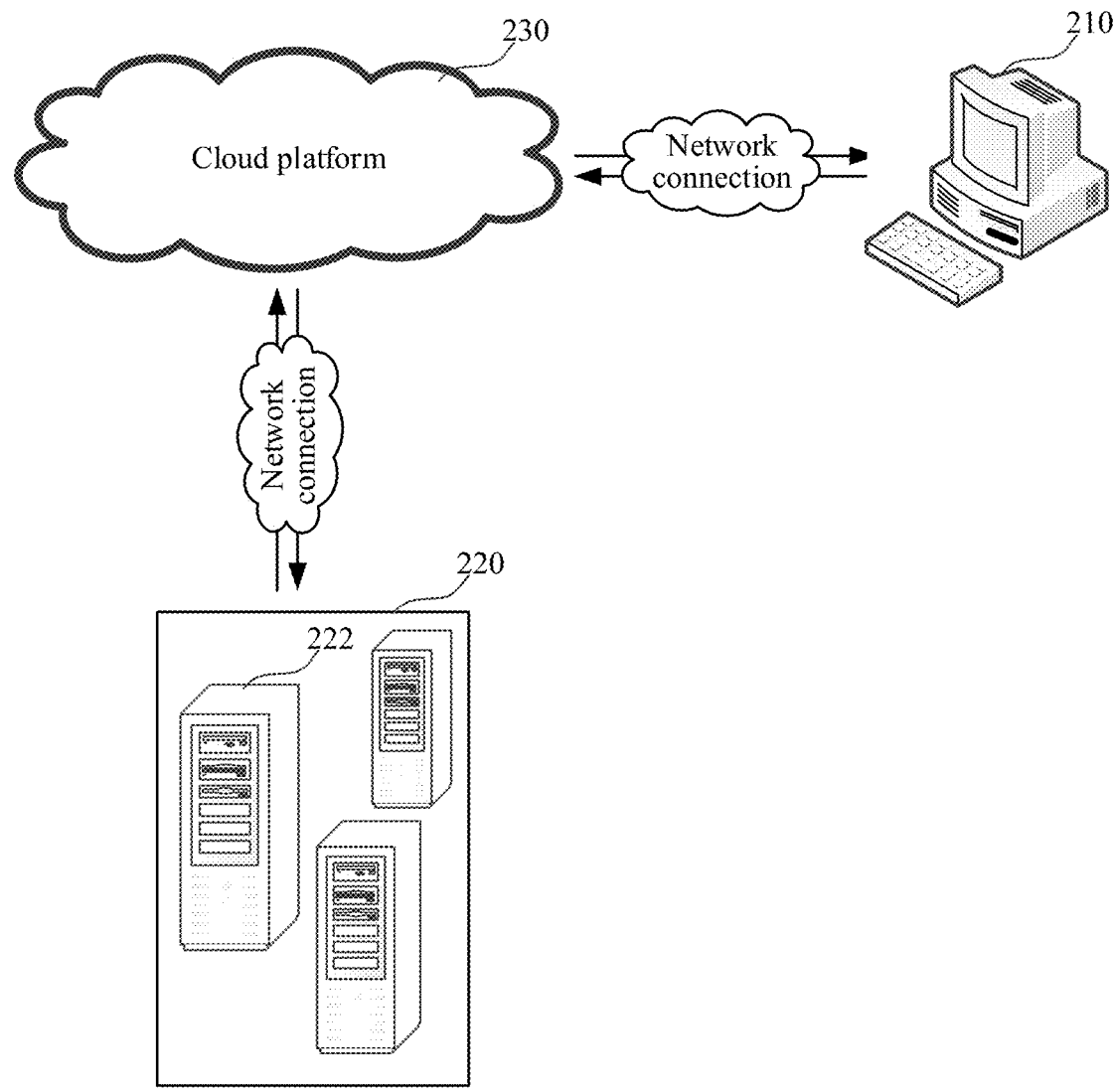
FIG. 2 is a diagram of an application scenario of a database configuration parameter processing method in an embodiment.

FIG. 2 is a diagram of an application scenario of a database configuration parameter processing method in an embodiment. Referring to FIG. 2, the application scenario includes a server cluster 220, a cloud platform 230 constructed based on the server cluster 220, and a user terminal 210 and, the server cluster 220 includes a master server 222. The master server 222 controls the cloud platform 230 and other servers in the server cluster 220 through a network connection. The user terminal 210 obtains, through a network connection, a database service provided by the cloud platform 230, and accesses a database in the cloud platform 230 through the network connection.

Figure 3:
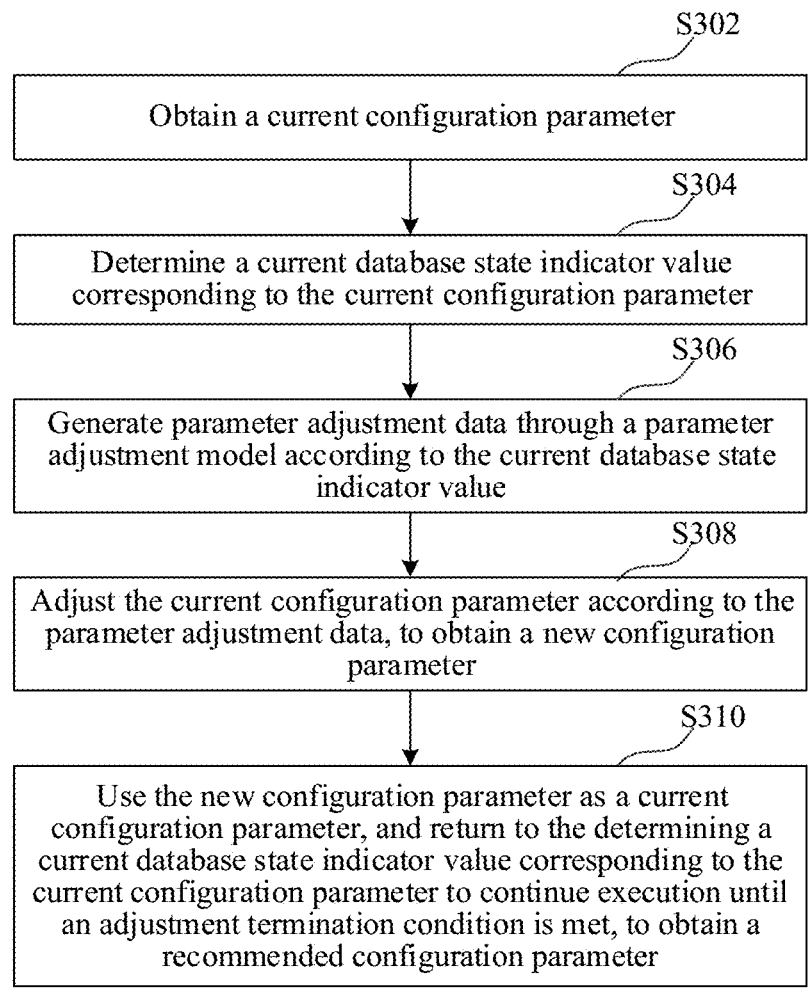
FIG. 3 is a schematic flowchart of a database configuration parameter processing method in an embodiment.
Figure 15:
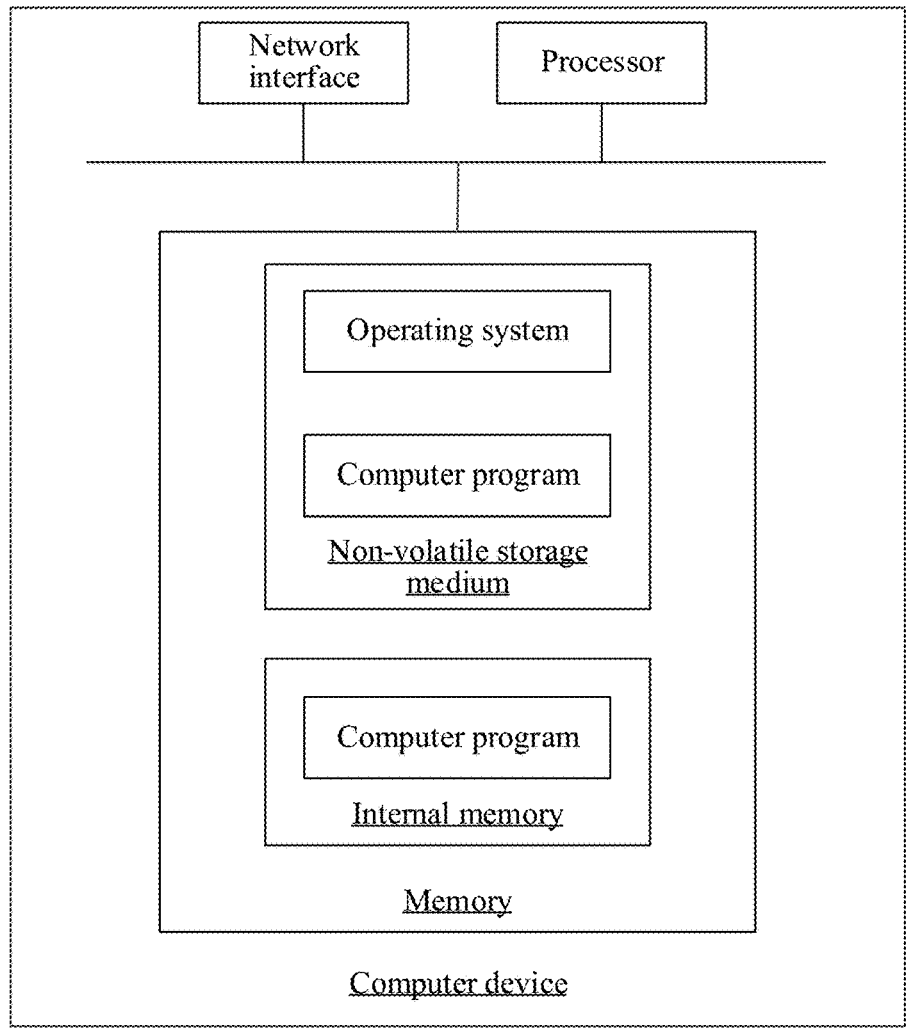
FIG. 15 is a schematic diagram of an internal structure of a computer device in an embodiment.

As shown in FIG. 3, in an embodiment, a database configuration parameter processing method is provided. The database configuration parameter processing method may be applied to the server 120 in FIG. 1 or the master server 222 in the server cluster 220 in FIG. 2, or may be applied to the user terminal 110 in FIG. 1 or the user terminal 210 in FIG. 2. In the disclosure, as shown in FIG. 15, the server 120, the master server 222, the user terminal 110, and the user terminal 210 may be collectively referred to as a computer device. For illustratively purposes, an embodiment is mainly described by using an example in which the method is applied to the server 120 in FIG. 1. Referring to FIG. 3, the database configuration parameter processing method includes the following operations S302-S310:

S302. Obtain a current configuration parameter.

The configuration parameter refers to a configuration parameter corresponding to a database. The current configuration parameter refers to a configuration parameter of a database that is currently used. The configuration parameter may include, for example but not limited to, a database management parameter, a database parameter, and an environment variation parameter.

In an example, the server obtains a database identifier, and transmits a configuration parameter obtaining request to a database corresponding to the database identifier. The server obtains a configuration parameter returned by the database according to the configuration parameter obtaining request, and uses the obtained configuration parameter as the current configuration parameter. The database identifier may be transmitted by a user terminal.

In an embodiment, the server stores configuration parameters of a plurality of databases, and stores the configuration parameters of the plurality of databases in correspondence with the database identifiers. The server obtains a database identifier, queries the stored configuration parameters for a configuration parameter corresponding to the obtained database identifier, and uses the queried configuration parameter as the current configuration parameter.

S304. Determine a current database state indicator value corresponding to the current configuration parameter.

The database state indicator value is data used for representing a state of the database during running. The current database state indicator value is data detected during running of a database configured according to the current configuration parameter.

Specifically, after obtaining a current configuration parameter, the server configures a database according to the obtained current configuration parameter, monitors the database configured according to the current configuration parameter, and obtains a current database state indicator value through monitoring.

In an embodiment, after obtaining a current configuration parameter, the server configures the database according to the current configuration parameter. The server calls a database access simulation program to generate database access data through simulation, accesses, according to the database access data generated through simulation, the database configured based on the current configuration parameter, and monitors the database, to obtain a current database state indicator value. The database access simulation program may generate various database access requests according to a preset database access feature.

For example, the server calls the database access simulation program to generate a large quantity of data query requests, data insert requests, and/or data modification requests through simulation, and the server accesses, according to the data query requests, the data insert requests, and/or the data modification requests generated through simulation, the database configured according to the current configuration parameter.

S306. Generate parameter adjustment data through a parameter adjustment model according to the current database state indicator value.

The parameter adjustment model is a data model that generates parameter adjustment data according to a current database state indicator value. The parameter adjustment model may be a deep reinforcement learning model. The parameter adjustment data is data based on which the current configuration parameter of the database is adjusted, and the parameter adjustment data includes an adjustment direction for each configuration parameter. The adjustment direction may be any one of increasing, remaining unchanged, and decreasing.

The server inputs the current database state indicator value into the parameter adjustment model as an input, and obtains parameter adjustment data outputted by the parameter adjustment model according to the current database state indicator value.

In an embodiment, the current database state indicator value is inputted into a neural network model of the parameter adjustment model, and parameter adjustment data generated by the neural network model through iterative adjustments is obtained. The neural network model is a data model that is trained by using a current database state indicator value, to obtain parameter adjustment data.

S308. Adjust the current configuration parameter according to the parameter adjustment data, to obtain a new configuration parameter.

Specifically, the server traverses each configuration parameter in the current configuration parameters, queries for parameter adjustment data corresponding to the traversed configuration parameter, adjusts the traversed configuration parameter according to the parameter adjustment data found through query, and uses the adjusted configuration parameter as the new configuration parameter.

In an embodiment, the server collects statistics of the parameter adjustment data, obtains an adjustment direction and a quantity of adjustments of each configuration parameter through statistic collection, and adjusts a corresponding current configuration parameter according to the adjustment direction and quantity of adjustments of each configuration parameter that are obtained through statistic collection, to obtain a new configuration parameter corresponding to the current configuration parameter.

For example, the server collects statistics of the parameter adjustment data, obtains, through statistic collection, that an adjustment direction of a configuration parameter A in the current configuration parameters is increasing, and a quantity of adjustments is three, and then, increases the configuration parameter A three times according to the adjustment direction and the quantity of times, to obtain a new configuration parameter Anew corresponding to the configuration parameter A.

S310. Use the new configuration parameter as a current configuration parameter, and return to the determining the current database state indicator value corresponding to the current configuration parameter to continue execution until an adjustment termination condition is met, to obtain a recommended configuration parameter.

The adjustment termination condition is a condition that needs to be met for terminating a cyclical adjustment. The adjustment termination condition may be a preset termination target of a configuration parameter obtained after the adjustment, or a present quantity of cyclical adjustments for termination. The preset termination target may be a preset condition met by the configuration parameter. The recommended configuration parameter is a configuration parameter required by the database for optimal database performance. The database state indicator value is indicator data used for representing a running state of the database. The database state indicator includes a quantity of requests, a volume of data, and the like.

Specifically, after obtaining the new configuration parameter, the server uses the new configuration parameter as a current configuration parameter, and continues to perform the operations of determining a current database state indicator value corresponding to the current configuration parameter; generating parameter adjustment data through a parameter adjustment model according to the current database state indicator value; and adjusting the current configuration parameter according to the parameter adjustment data, to obtain a new configuration parameter, until an adjustment termination condition is met, to obtain a current configuration parameter upon adjustment termination as the recommended configuration parameter.

In an embodiment, a current database state indicator value corresponding to a current configuration parameter is determined, and parameter adjustment data is generated through a parameter adjustment model according to the current database state indicator value, thereby improving accuracy of the generated parameter adjustment data. The current configuration parameter is adjusted according to the generated parameter adjustment data, to obtain a new configuration parameter, the new configuration parameter is used as a current configuration parameter (that is, the current configuration parameter is updated to the new configuration parameter), and execution of determining a current database state indicator value corresponding to the current configuration parameter is continued until the adjustment termination condition is met, to obtain the recommended configuration parameter. The current configuration parameter is adjusted continuously and automatically by using the parameter adjustment data generated by using the parameter adjustment model, to finally obtain the recommended configuration parameter when the adjustment termination condition is met, thereby improving accuracy of the recommended configuration parameter.

In an embodiment, the database configuration parameter processing method performed by the terminal may further include: receiving a parameter adjustment instruction that is triggered through a user account; and determining the adjustment termination condition according to the parameter adjustment instruction.

The user account is a unique identifier used for a user to log in to the server, and the user may be specifically a natural person and/or an enterprise. The parameter adjustment instruction is an instruction used for instructing the server to obtain the recommended configuration parameter of the database.

Specifically, the user inputs the user account in a login page of a user terminal, logs in to a database parameter configuration page, and enters a preset performance indicator value in the database parameter configuration page. When the user terminal detects a preset user operation on the database parameter configuration page (e.g., a parameter adjustment button included in the database parameter configuration page is tapped), the preset performance indicator value entered in the database parameter configuration page is obtained, a parameter adjustment instruction is generated according to the obtained preset performance indicator value, and the parameter adjustment instruction is transmitted to the server. The server receives the parameter adjustment instruction transmitted by the user terminal, parses the parameter adjustment instruction, extracts a preset performance indicator value in the adjustment instruction through parsing, and uses the preset performance indicator value as the adjustment termination condition. The performance indicator value is indicator data used for representing data processing performance of a database. The performance indicator includes, for example but not limited to, throughput, time delay, memory usage, and the like.

In this embodiment, a parameter adjustment instruction that is triggered through a user account is received, an adjustment termination condition is determined according to the parameter adjustment instruction, and a recommended configuration parameter meeting the adjustment termination condition is obtained, thereby improving accuracy of obtaining the recommended configuration parameter.

In an embodiment, operation S302 may include: obtaining a current configuration parameter corresponding to a database corresponding to the user account.

Specifically, the parameter adjustment instruction includes the user account. The server extracts the user account from the parameter adjustment instruction, queries for a database identifier corresponding to the user account, and transmits a parameter obtaining request to a database corresponding to the database identifier. After receiving the parameter obtaining request, the database transmits the current configuration parameter to the server. The server receives the current configuration parameter transmitted by the database, and uses the obtained current configuration parameter as a current configuration parameter of the database corresponding to the user account.

In an embodiment, the parameter adjustment instruction includes the database identifier. The server extracts the database identifier from the parameter adjustment instruction, and transmits the parameter obtaining request to the database corresponding to the database identifier. After receiving the parameter obtaining request, the database transmits the current configuration parameter to the server. The server receives the current configuration parameter transmitted by the database, and uses the obtained current configuration parameter as a current configuration parameter of the database corresponding to the database identifier.

In an embodiment, the parameter adjustment instruction includes the user account or the database identifier. The server stores the configuration parameter, and the configuration parameter in the server is stored in correspondence with the user account or the database identifier. The server queries stored configuration parameters for a configuration parameter corresponding to the user account or the database identifier, and uses the configuration parameter obtained through query as a current configuration parameter corresponding to the database corresponding to the user account.

In this embodiment, after receiving a parameter adjustment instruction that is transmitted through a user account, an adjustment termination condition is determined according to the parameter adjustment instruction, and a current configuration parameter of a database corresponding to the user account is obtained, to ensure that an accurate current configuration parameter is obtained.

Figure 4:
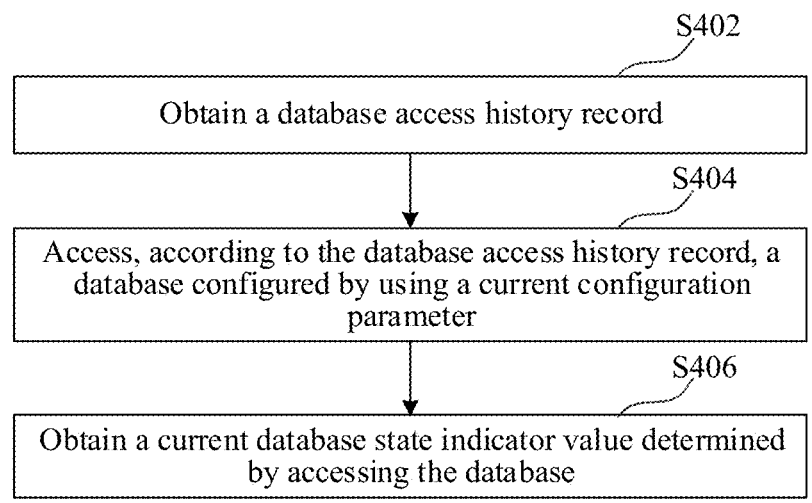
FIG. 4 is a schematic flowchart of operations of obtaining an indicator value in an embodiment.

As shown in FIG. 4, in an embodiment, operation S302 specifically includes an operation of obtaining an indicator value, and the operation of obtaining the indicator value may include operations S402-S406.

S402. Obtain a database access history record.

The database access history record is recorded history access data of a database. The database access history record specifically includes at least one of a time of access to the database, an access request type, and an access user.

Specifically, the server stores database access history records of a plurality of databases. The server may query the database access history records for a corresponding database access history record according to the user account or the database identifier.

S404. Access, according to the database access history record, a database configured by using a current configuration parameter.

Specifically, after obtaining the database access history record, the server generates a database access request according to the database access history record, and accesses the database according to the database access request.

In an embodiment, the server traverses each record in the database access history records, generates a database access request corresponding to each record according to each traversed record, obtains a database access flow according to the database access request, and accesses the database according to the database access flow.

S406. Obtain a current database state indicator value determined by accessing the database.

The database state indicator value is data used for representing a running state of the database.

Specifically, when accessing the database according to the database access history record, the server monitors the database according to the database state indicator, obtains a database state indicator value through monitoring, and uses the obtained database state indicator value as a current database state indicator value.

In this embodiment, a database configured by using a current configuration parameter is accessed by using a recorded database access history record, and a current database state indicator value determined by accessing the database is obtained, to ensure that the current database state indicator value corresponding to the current configuration parameter is obtained, accuracy of the current database state indicator value is determined, and further parameter adjustment data is generated through a parameter adjustment model according to the current database state indicator value, thereby improving accuracy of the parameter adjustment data.

Figure 5:
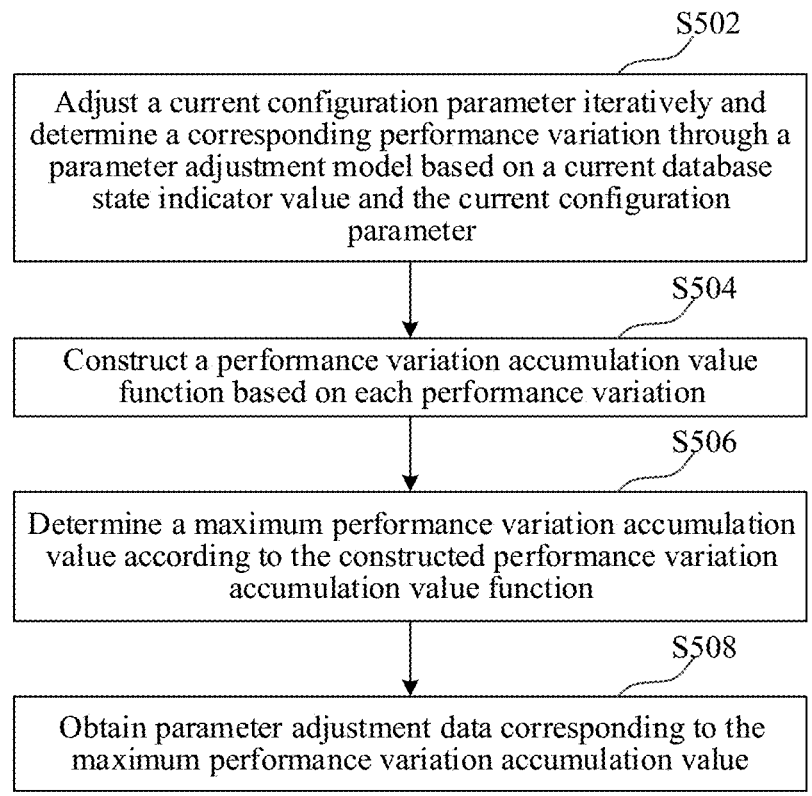
FIG. 5 is a schematic flowchart of operations of generating parameter adjustment data in an embodiment.

As shown in FIG. 5, in an embodiment, operation S306 includes an operation of generating the parameter adjustment data, which may include operations S502-S508.

S502. Adjust the current configuration parameter iteratively and determine a corresponding performance variation through the parameter adjustment model based on the current database state indicator value and the current configuration parameter.

The performance variation is data representing a performance change of a database run by using a new configuration parameter that is obtained after the configuration parameter is adjusted, compared with a previously adjusted database. A larger performance variation indicates a greater improvement of data processing performance of the database, and a smaller performance variation indicates a smaller improvement of data processing performance of the database.

Specifically, the server inputs the current database state indicator value and the current configuration parameter into the parameter adjustment model, and the parameter adjustment model adjusts the current configuration parameter to obtain an adjusted configuration parameter, and records parameter adjustment data. A database state indicator value and a performance variation corresponding to the adjusted configuration parameter are determined, and the determined database state indicator value and the recorded adjustment data are inputted into the parameter adjustment model again for an iteration, to obtain a performance variation corresponding to each adjustment.

Figure 6:
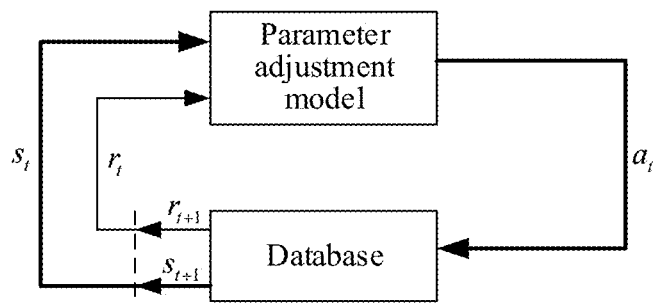
FIG. 6 is a schematic diagram of adjusting a configuration parameter iteratively in an embodiment.

FIG. 6 is a schematic diagram of adjusting a configuration parameter iteratively in an embodiment. The server obtains a database state indicator value $s_t$ of the database at a moment t, and inputs the database state indicator value $s_t$ into the parameter adjustment model, and the parameter adjustment model outputs parameter adjustment data $a_t$ at the moment t. The server adjusts the configuration parameter of the database according to the parameter adjustment data $a_t$, obtains a performance variation $r_t$ corresponding to the database whose configuration parameter at the moment t has been adjusted according to $a_t$ and obtains a database state indicator value $s_{t+1}$ at a moment t+1, and feeds back the database state indicator value $s_{t+1}$ and the performance variation $r_t$ to the parameter adjustment model for iterative cycles until an iteration stop condition is met.

S504. Construct a performance variation accumulation value function based on each performance variation.

The performance variation accumulation value represents a total processing performance variation of a database after iterative adjustments. The performance variation accumulation value function is a function used for calculating a performance variation accumulation value according to performance variations.

Specifically, after obtaining a performance variation corresponding to each adjustment, the server performs accumulation or weighted summation based on the performance variation after the current adjustment, to calculate a performance variation accumulation value corresponding to the current adjustment, thereby constructing a performance variation accumulation value function.

In an embodiment, the server adds a weight for each performance variation, to obtain the following performance variation accumulation value function:

$$Q(s_t, a_{dt}; w) = r_{t+1} + \gamma Q(s_{t+1}, a_{t+1}; w)$$

where $s_t$ represents the database state indicator value at the moment t, $a_t$ represents the parameter adjustment data at the moment t, $r_{t+1}$ represents a performance variation at the moment t+1 after the configuration parameter at the moment t is adjusted according to $a_t$, and $s_{t+1}$ represents the database state indicator value at the moment t+1 after the configuration parameter at the moment t is adjusted according to $a_t$, where w represents a parameter in the parameter adjustment model, $\gamma$ represents a discount coefficient, and $\gamma < 1$.

S506. Determine a maximum performance variation accumulation value according to the performance variation accumulation value function.

Specifically, the server obtains the performance variation accumulation value corresponding to each adjustment, compares the obtained performance variation accumulation values pairwise, and selects the maximum performance variation accumulation value from the performance variation accumulation values according to a comparison result.

In an embodiment, the server determines a maximum performance variation accumulation value corresponding to the performance variation accumulation value function according to the performance variation accumulation value function.

S508. Obtain parameter adjustment data corresponding to the maximum performance variation accumulation value.

Specifically, the server stores a performance variation accumulation value and parameter adjustment data corresponding to each adjustment, and stores a performance variation accumulation value and parameter adjustment data of the same adjustment in correspondence. After determining the maximum performance variation accumulation value, the server extracts the parameter adjustment data corresponding to the maximum performance variation accumulation value from the stored parameter adjustment data.

In an embodiment, the server inputs the maximum performance variation accumulation value into the parameter adjustment model, and the parameter adjustment model outputs corresponding parameter adjustment data according to the performance variation accumulation value.

In this embodiment, a performance variation corresponding to each adjustment is determined by adjusting a current configuration parameter iteratively through a parameter adjustment model according to a current database state indicator value and the current configuration parameter, a performance variation accumulation value corresponding to each adjustment is determined according to each performance variation, and parameter adjustment data corresponding to a maximum performance variation accumulation value is selected, to ensure that the performance variation of the database is maximum after the current configuration parameter is adjusted according to the selected parameter adjustment data, thereby improving accuracy of parameter adjustment.

Figure 7:
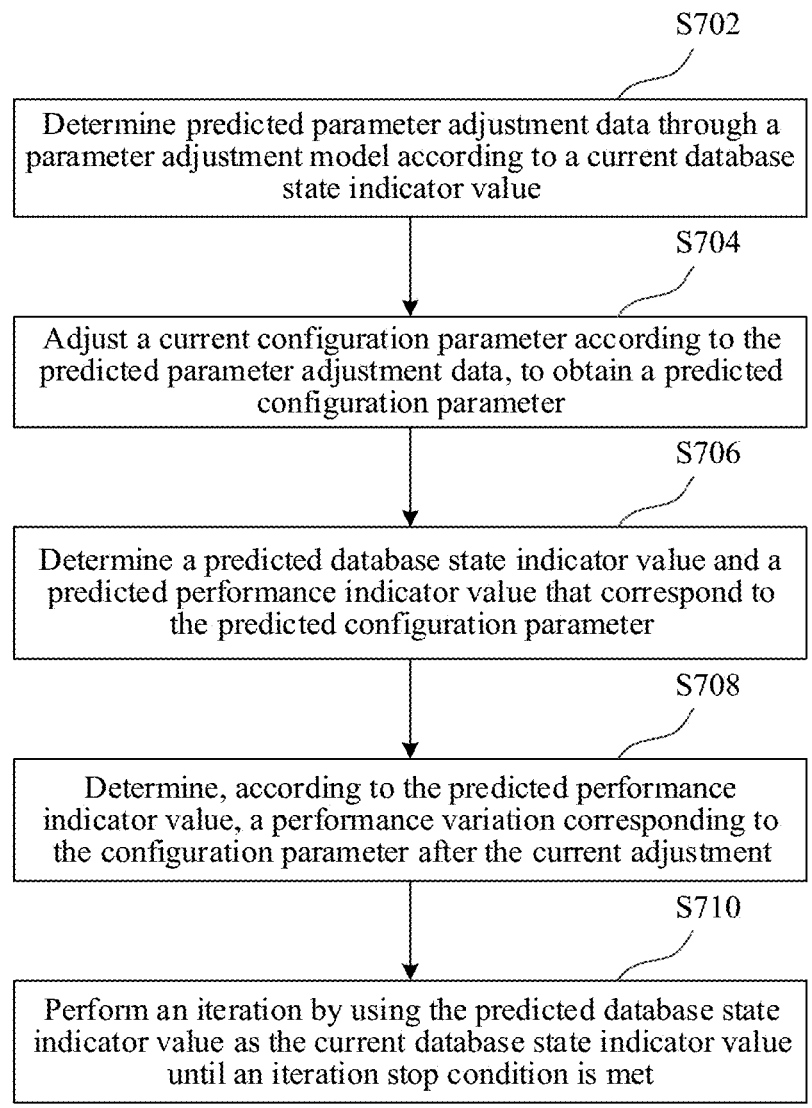
FIG. 7 is a schematic flowchart of operations of performing an iteration according to a database state indicator value in an embodiment.

As shown in FIG. 7, in an embodiment, operation S502 includes an operation of performing an iteration according to the database state indicator value, and the operation of performing an iteration may include operations S702-S710.

S702. Determine predicted parameter adjustment data through a parameter adjustment model according to a current database state indicator value.

The predicted parameter adjustment data is parameter adjustment data generated in a training process of the parameter adjustment model for generating parameter adjustment data in an iteration process of the parameter adjustment model.

Specifically, the server inputs the current database state indicator value into the parameter adjustment model, and the parameter adjustment model randomly generates the predicted parameter adjustment data.

In an embodiment, the server randomly generates an adjustment parameter for each indicator value in the current database state indicator values, and generates initial predicted parameter adjustment data according to the adjustment parameter of each indicator value. The adjustment parameter of each indicator value includes a vector having three dimensions, the three dimensions representing increasing, remaining unchanged, and decreasing respectively.

S704. Adjust a current configuration parameter according to the predicted parameter adjustment data, to obtain a predicted configuration parameter.

The predicted configuration parameter is a configuration parameter generated by adjusting the current configuration parameter according to the predicted parameter adjustment data.

Specifically, after obtaining the predicted parameter adjustment data, the server traverses each parameter in the current configuration parameters, queries the predicted parameter adjustment data for an adjustment parameter corresponding to the configuration parameter obtained through traversal, adjusts the traversed configuration parameter according to the adjustment parameter found through query, to obtain an adjusted configuration parameter, and predicts a configuration parameter according to the adjusted configuration parameter.

In an embodiment, the server queries the predicted parameter adjustment data for an adjustment parameter corresponding to the traversed configuration parameter, obtains, according to the adjustment parameter, an end value corresponding to the traversed configuration parameter, and adjusts, according to the end value and the adjustment parameter, the traversed configuration parameter. For each adjustment of the configuration parameter, a maximum value or a minimum value in the configuration parameters after the previous adjustment is used as an end value corresponding to the current adjustment.

For example, if an adjustment parameter corresponding to the traversed configuration parameter is increasing, the server obtains an end value corresponding to the traversed configuration parameter according to the adjustment parameter, and a current configuration parameter value is 2, then the end value includes 2 and x (x>2); if an adjustment parameter corresponding to the traversed configuration parameter is decreasing, the server obtains an end value corresponding to the traversed configuration parameter according to the adjustment parameter, and a current configuration parameter value is 2, then the end value includes x (x<2) and 2; and if an adjustment parameter corresponding to the traversed configuration parameter is remaining unchanged, and a current configuration parameter value is 2, then both end values are 2.

S706. Determine a predicted database state indicator value and a predicted performance indicator value that correspond to the predicted configuration parameter.

The predicted database state indicator value and the predicted performance indicator value are respectively a database state indicator value and a performance indicator value that are obtained by monitoring the database configured by using the predicted configuration parameter.

Specifically, the server configures the database according to the predicted configuration parameter, obtains a database access history record, and accesses, according to the database access history record, the database configured by using the predicted configuration parameter. The server monitors a database state indicator and a performance indicator of the database in an access process, and uses the database state indicator and the performance indicator that are detected respectively as a predicted database state indicator value and a predicted performance indicator value that correspond to the predicted configuration parameter.

S708. Determine, according to the predicted performance indicator value, the performance variation corresponding to the configuration parameter after the current adjustment.

Specifically, the server stores a correspondence between a performance indicator value and a performance variation. After obtaining the predicted performance indicator value, the server determines a performance variation corresponding to the predicted performance indicator value according to the correspondence between the performance indicator value and the performance variation, and uses the determined performance variation as a performance variation corresponding to the configuration parameter after the current adjustment.

S710. Perform an iteration by using the predicted database state indicator value as the current database state indicator value until an iteration stop condition is met.

The iteration stop condition is a condition that needs to be met when the iteration process stops. The iteration stop condition may be specifically a quantity of iterations.

Specifically, after obtaining the predicted database state indicator value, the server uses the predicted database state indicator value as the current database state indicator value, and continues to perform the operations of determining predicted parameter adjustment data through a parameter adjustment model according to the current database state indicator value, adjusting the current configuration parameter according to the predicted parameter adjustment data, to obtain a predicted configuration parameter, determining a predicted database state indicator value and a predicted performance indicator value that correspond to the predicted configuration parameter, and determining, according to the predicted performance indicator value, the performance variation corresponding to the configuration parameter after the current adjustment until the iteration stop condition is met.

In an embodiment, the server records a quantity of iterations in the parameter adjustment model, and if the recorded quantity of iterations is equal to a quantity of times for an iteration stop in the iteration stop condition, the iteration is stopped.

In this embodiment, an iteration is performed through a parameter adjustment model according to a current database state indicator value, and accuracy of parameter adjustment data generated by the parameter adjustment model may be improved through the iteration. Also, a configuration parameter is adjusted according to the parameter adjustment data with relatively high accuracy, to improve efficiency of obtaining a recommended configuration parameter.

In an embodiment, operation S708 further includes: obtaining a quantity of times that the current configuration parameter is adjusted in an iteration process; and determining, according to the predicted performance indicator value and the quantity of times, the performance variation corresponding to the configuration parameter after the current adjustment, the performance variation being negatively correlated to the quantity of times and being positively correlated to the predicted performance indicator value.

Specifically, the server constructs a performance variation calculation formula by making the performance variation negatively correlated to the quantity of times and positively correlated to the predicted performance indicator value, and stores the constructed performance variation calculation formula. The server obtains a quantity of times that the current configuration parameter is adjusted and a predicted performance indicator value of the current configuration parameter in the iteration process, and inputs the quantity of times and the predicted performance indicator value into the performance variation calculation formula to calculate a performance variation.

In an embodiment, the performance variation may be calculated according to the following formula:

$$r = \frac{(\alpha_1 p_1 + \alpha_2 p_2 + \ldots + \alpha_n p_n)q + b}{q}$$

In the foregoing formula, p represents a preset indicator value, q represents a quantity of times that the configuration parameter is adjusted, r represents a performance variation, a is a coefficient corresponding to each preset indicator value, and b is a constant. $p_1, p_2, \ldots,$ and $p_n$, respectively represent n preset indicator values, and $a_1, a_2, \ldots,$ and $a_n$ respectively represent n coefficients corresponding to the corresponding preset indicator values, where the performance variation r is negatively correlated to the quantity of times q, and the performance variation r is positively correlated to the predicted performance indicator value p.

In an embodiment, operation S310 includes: obtaining a database performance indicator value corresponding to the new configuration parameter; and using the new configuration parameter as a current configuration parameter in a case that the obtained database performance indicator value does not match a preset performance indicator value in the adjustment termination condition, or a quantity of cycles is less than a preset quantity, and returning to the determining a current database state indicator value corresponding to the current configuration parameter to continue execution until a database performance indicator value corresponding to the new configuration parameter matches the preset performance indicator value or the quantity of cycles reaches the preset quantity.

Specifically, the server configures the database by using the new configuration parameter, and accesses, according to the database access history record, the database configured by using the new configuration parameter. In the access monitoring process, the server obtains a database performance indicator value corresponding to the database configured by using the new configuration parameter. The server extracts a preset performance indicator value in the adjustment termination condition, detects whether the obtained database performance indicator value matches the extracted preset performance indicator value, if yes, terminates the adjustment, and if not, uses the new configuration parameter as the current configuration parameter, and returns to the determining a current database state indicator value corresponding to the current configuration parameter to continue cyclic execution.

In an embodiment, the server records the quantity of cycles, compares the recorded quantity of cycles with the preset quantity in the adjustment termination condition, if the recorded quantity of cycles is less than the preset quantity, uses the new configuration parameter as the current configuration parameter, and returns to the determining a current database state indicator value corresponding to the current configuration parameter to continue cyclic execution, and if the recorded quantity of cycles is equal to the preset quantity, terminates the adjustment.

In an embodiment, operation S506 includes: obtaining a model parameter of a first neural network model in the parameter adjustment model; inputting the obtained model parameter into a second neural network model; and determining the maximum performance variation accumulation value corresponding to the constructed performance variation accumulation value function through the second neural network model.

The parameter adjustment model includes the first neural network model and the second neural network model. The first neural network model is configured to determine matching parameter adjustment data according to the performance variation accumulation value; and the second neural network model is configured to determine the maximum performance variation accumulation value.

Specifically, the server inputs the current database state indicator value into the first neural network model for iteration, to obtain a stable first neural network model after a preset quantity of iterations. The server obtains a model parameter in the first neural network model, and injects the obtained model parameter into the second neural network model. The server obtains a database state indicator value and a performance variation generated in an iteration process of the first neural network model, and inputs the obtained database state indicator value and performance variation into the second neural network model, and the second neural network model determines a maximum performance variation accumulation value corresponding to the constructed performance variation accumulation value function according to the inputted database state indicator value and performance variation.

In an embodiment, the server inputs the current database state indicator value into the first neural network model, and the first neural network model randomly generates parameter adjustment data, and uses the randomly generated parameter adjustment data as initial parameter adjustment data for iterative training, until a stable first neural network model is obtained.

In an embodiment, S508 includes: performing gradient descent processing on the maximum performance variation accumulation value, to obtain a maximum estimated accumulation value matching the maximum performance variation accumulation value; and determining the parameter adjustment data corresponding to the maximum estimated accumulation value through the first neural network model.

Specifically, after determining the maximum performance variation accumulation value through the second neural network model, the server performs gradient descent processing on the maximum performance variation accumulation value by using the parameter adjustment model, so that the obtained maximum estimated accumulation value approximates the maximum performance variation accumulation value infinitely, and uses the obtained maximum estimated accumulation value as a maximum estimated accumulation value matching the maximum performance variation accumulation value. The server inputs the maximum estimated accumulation value into the first neural network model, obtains parameter adjustment data outputted by the first neural network model according to the maximum estimated accumulation value, and uses the obtained parameter adjustment data as the parameter adjustment data corresponding to the maximum estimated accumulation value.

In this embodiment, a model parameter in a first neural network model in a parameter adjustment model is inputted into a second neural network model, thereby ensuring consistency between the first neural network model and the second neural network model, and improving accuracy of data processing. A maximum performance variation accumulation value is determined by using the second neural network model, and a maximum estimated accumulation value is obtained by performing gradient descent processing on the maximum performance variation accumulation value, so that a performance variation accumulation value corresponding to the parameter adjustment data returned by the first neural network model is ensured to be maximum, thereby improving efficiency of generation of the parameter adjustment data.

Figure 8:
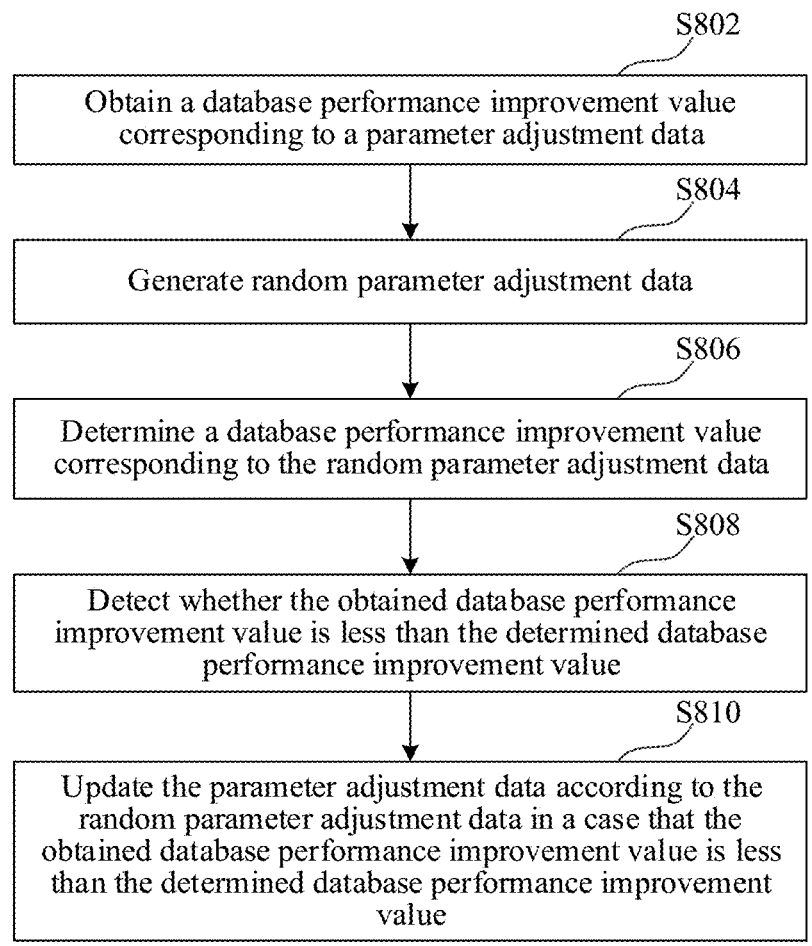
FIG. 8 is a schematic flowchart of operations of detecting parameter adjustment data in an embodiment.

As shown in FIG. 8, in an embodiment, after operation S306, the method further includes an operation of detecting the parameter adjustment data, and the operation of detecting the parameter adjustment data includes operations S802-S810.

S802. Obtain a database performance improvement value corresponding to the parameter adjustment data.

Specifically, the server adjusts the current configuration parameter of the database according to the parameter adjustment data, configures the database by using the adjusted configuration parameter, and accesses, according to the database access history record, the database configured by using the adjusted configuration parameter. The server monitors the database in the access process, obtains a database performance indicator value through monitoring, and calculates a database performance improvement value according to the database performance indicator value.

In an embodiment, after obtaining the database performance indicator value, the server performs, according to a weight corresponding to each database performance indicator value and a corresponding database performance indicator value, weighted summation to obtain the database performance improvement value.

S804. Generate random parameter adjustment data.

A program for randomly generating adjustment data is a program for generating parameter adjustment data according to a feature of the parameter adjustment data.

Specifically, when obtaining the parameter adjustment data returned by the parameter adjustment model, the server triggers a program call instruction, and generates the random parameter adjustment data according to the program call instruction by using the program for randomly generating adjustment data.

S806. Determine a database performance improvement value corresponding to the random parameter adjustment data.

Specifically, the server adjusts the current configuration parameter of the database according to the random parameter adjustment data, configures the database by using the adjusted configuration parameter, and accesses, according to the database access history record, the database configured by using the adjusted configuration parameter. The server monitors the database in the access process, obtains a database performance indicator value through monitoring, and calculates a database performance improvement value according to the database performance indicator value, to obtain a database performance improvement value corresponding to the random parameter adjustment data.

S808. Detect whether the obtained database performance improvement value is less than the determined database performance improvement value.

Specifically, the server compares the obtained database performance improvement value with the determined database performance improvement value, and determines whether the obtained database performance improvement value is less than the determined database performance improvement value through comparison.

S810. Update the parameter adjustment data according to the random parameter adjustment data in a case that the obtained database performance improvement value is less than the determined database performance improvement value.

Specifically, when the obtained database performance improvement value is less than the determined database performance improvement value, the server replaces the parameter adjustment data with the random parameter adjustment data; and when the obtained database performance improvement value is greater than or equal to the determined database performance improvement value, the server does not need to update the parameter adjustment data.

In this embodiment, a database performance improvement value corresponding to parameter adjustment data generated by using a parameter adjustment model is compared with a database performance improvement value corresponding to random parameter adjustment data, if the obtained database performance improvement value is less than the determined database performance improvement value, the configuration is adjusted according to the random parameter adjustment data, and the database performance improvement is better, and the parameter adjustment data is updated according to the random parameter adjustment data, thereby improving a degree by which database performance is improved after the configuration parameter is adjusted according to the parameter adjustment data.

Figure 9:
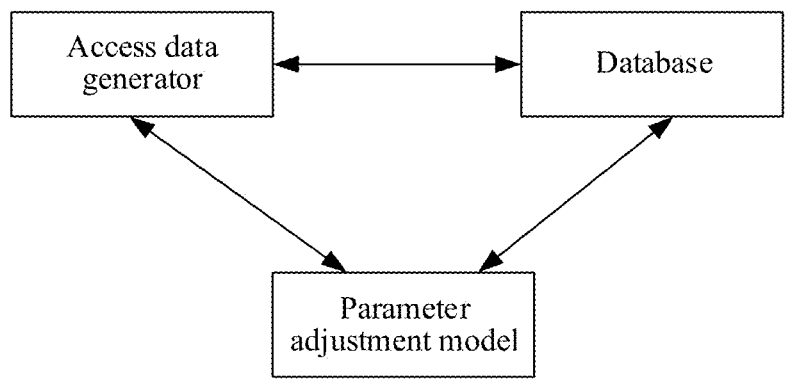
FIG. 9 is a schematic diagram of a deployment environment of a database configuration parameter processing method in an embodiment.

FIG. 9 is a schematic diagram of a deployment environment of a database configuration parameter processing method in an embodiment. Referring to FIG. 9, the deployment environment includes an access data generator, a database, and a parameter adjustment model. The access data generator is configured to generate database access data used for accessing the database. The server obtains a current configuration parameter of the database, calls the access data generator to generate database access data, and accesses the database according to the database access data. The server obtains a current database state indicator value corresponding to the current configuration parameter, drives the parameter adjustment model, and generates parameter adjustment data according to the current database state indicator value. The server adjusts the current configuration parameter according to the parameter adjustment data, to obtain a new configuration parameter, and uses the new configuration parameter as a current configuration parameter of the database, and the server obtains a current database state indicator value corresponding to the current configuration parameter again until the adjustment termination condition is met, to obtain the recommended configuration parameter.

Figure 10:
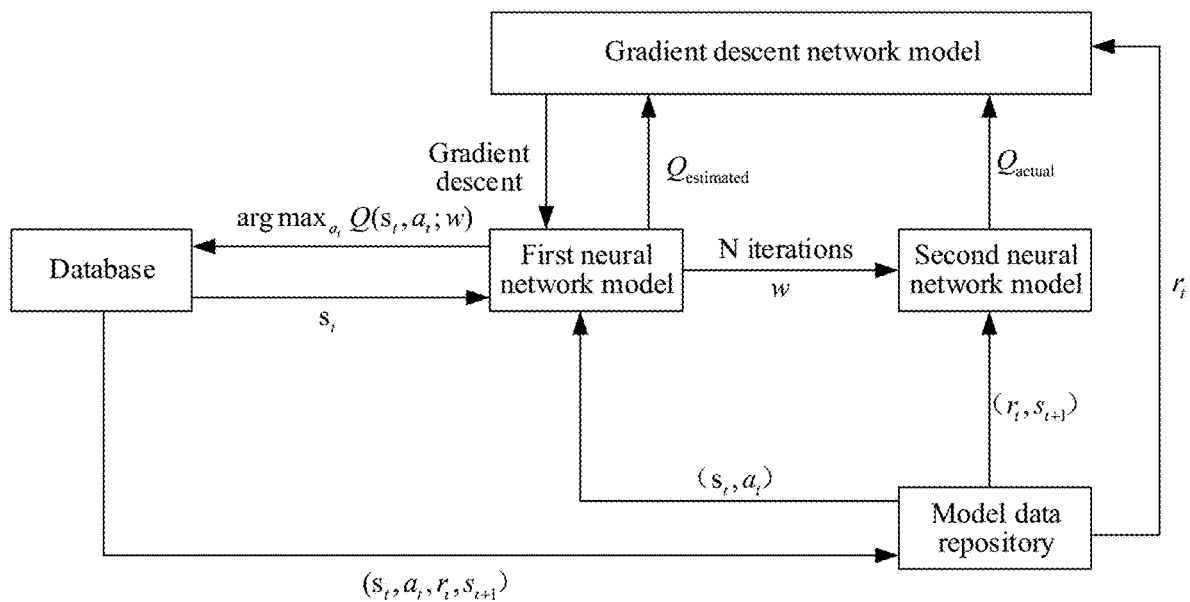
FIG. 10 is a schematic flowchart of a database configuration parameter processing method in an embodiment.

FIG. 10 is a schematic flowchart of a database configuration parameter processing method in an embodiment. FIG. 10 includes a database, a first neural network model, a second neural network model, a gradient descent network model, and a model data repository. The first neural network model and the second neural network model constitute a parameter adjustment model. In FIG. 10, $s_t$ represents a database state indicator value at a moment t, $a_t$ represents parameter adjustment data at the moment t, $r_t$ represents a performance variation after a configuration parameter at the moment t is adjusted according to $a_t$ and $s_{t+1}$ represents a database state indicator value at a moment t+1 after the configuration parameter at the moment t is adjusted according to $a_t$, where w represents a parameter in the parameter adjustment model, γ represents a discount coefficient, and γ<1.

The database transmits the database state indicator value $s_t$ at the moment t to the first neural network model. The first neural network model performs iterative training according to $s_t$, and a stable first neural network model is obtained after N iterations. The parameter w in the first neural network model is transmitted to the second neural network model, to keep the second neural network model consistent with the first neural network model. The database stores model data corresponding to each parameter adjustment in the model data repository, the model data including the database state indicator value $s_t$ at the moment t, the parameter adjustment data $a_t$ at the moment t, and the performance variation $r_t$ and the database state indicator value $s_{t+1}$ at the moment t+1 after the configuration parameter at the moment t is adjusted. The second neural network model is configured to determine a maximum performance variation accumulation value $Q_{actual} = \gamma + \gamma \max_{a_t} Q(s_{t-1}, a_{t-1}; w)$ according to the model data. The first neural network model calculates a maximum estimated accumulation value $\max Q_{estimated} = \max_{a_t} Q(s_t, a_t; w)$ according to the model data. The gradient descent network model adjusts $Q_{estimated}$ according to the model data and $Q_{actual}$ through gradient descent, to enable a difference between $Q_{estimated}$ and $Q_{actual}$ to be minimum, and to obtain the maximum $Q_{estimated} = \max_{a_t} Q(s_t, a_t; w)$. The first neural network model obtains parameter adjustment data $a_t = \arg\max_{a_t} Q(s_t, a_t; w)$ according to $\max Q_{estimated}$, and transmits the parameter adjustment data $a_t$ to the database, to adjust the parameter of the database.

Figure 11:
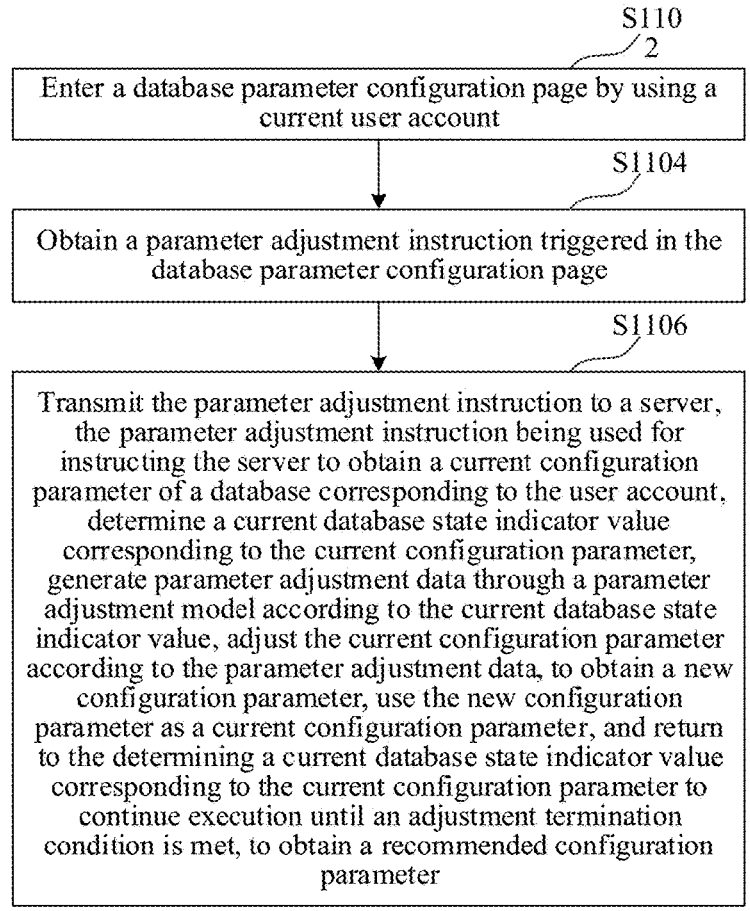
FIG. 11 is a schematic flowchart of a database parameter configuration method in an embodiment.

As shown in FIG. 11, in an embodiment, a database parameter configuration adjustment method is provided. The method includes operations S1102-S1106.

S1102. Enter a database parameter configuration page by using a current user account.

Specifically, the user inputs the user account in a login page of a user terminal. The user terminal obtains the user account inputted in the login page, generates a login request according to the obtained user account, and transmits the login request to the server. The server performs verification on the user account in the login request, and if the verification succeeds, the server returns database parameter configuration page data to the user terminal. The user terminal displays the database parameter configuration page according to the received database parameter configuration page data.

S1104. Obtain a parameter adjustment instruction triggered in the database parameter configuration page.

Specifically, a parameter adjustment button used for triggering the parameter adjustment instruction is provided in the database parameter configuration page. When the user terminal detects that the parameter adjustment button in the database parameter configuration page is tapped, the parameter adjustment instruction is triggered.

S1106. Transmit the parameter adjustment instruction to a server, the parameter adjustment instruction being used for instructing the server to obtain a current configuration parameter of a database corresponding to the user account, determine a current database state indicator value corresponding to the current configuration parameter, generate parameter adjustment data through a parameter adjustment model according to the current database state indicator value, adjust the current configuration parameter according to the parameter adjustment data, to obtain a new configuration parameter, use the new configuration parameter as a current configuration parameter, and return to the determining a current database state indicator value corresponding to the current configuration parameter to continue execution until an adjustment termination condition is met, to obtain a recommended configuration parameter.

The server receives the parameter adjustment instruction transmitted by the user terminal. The server obtains a current configuration parameter of a database corresponding to a user account in the parameter adjustment instruction according to the parameter adjustment instruction.

After obtaining a current configuration parameter, the server configures a database according to the obtained current configuration parameter, monitors the database configured according to the current configuration parameter, and obtains a current database state indicator value through monitoring.

In an embodiment, after obtaining a current configuration parameter, the server configures the database according to the current configuration parameter. The server calls a database access simulation program to generate database access data through simulation, accesses, according to the database access data generated through simulation, the database configured based on the current configuration parameter, and monitors the database, to obtain a current database state indicator value. The database access simulation program may generate various database access requests according to a preset database access feature.

For example, the server calls the database access simulation program to generate a large quantity of data query requests, data insert requests, and/or data modification requests through simulation, and the server accesses, according to the data query requests, the data insert requests, and/or the data modification requests generated through simulation, the database configured according to the current configuration parameter.

Parameter adjustment data is generated through a parameter adjustment model according to the current database state indicator value.

The parameter adjustment model is a data model generating parameter adjustment data according to a current database state indicator value. The parameter adjustment model may be a deep reinforcement learning model. The parameter adjustment data is data on which adjustment performed on the current configuration parameter of the database depends, and the parameter adjustment data includes an adjustment direction for each configuration parameter. The adjustment direction may be any one of increasing, remaining unchanged, and decreasing.

Specifically, the server inputs the current database state indicator value into the parameter adjustment model as an input, and obtains parameter adjustment data outputted by the parameter adjustment model according to the current database state indicator value.

In an embodiment, the current database state indicator value is inputted into a neural network model of the parameter adjustment model, and parameter adjustment data generated by the neural network model through iterative adjustments is obtained. The neural network model is a data model that is trained by using a current database state indicator value, to obtain parameter adjustment data.

The current configuration parameter is adjusted according to the parameter adjustment data, to obtain a new configuration parameter.

Specifically, the server traverses each configuration parameter in the current configuration parameters, queries the parameter adjustment data for parameter adjustment data corresponding to the traversed configuration parameter, adjusts the traversed configuration parameter according to the parameter adjustment data found through query, and uses the adjusted configuration parameter as the new configuration parameter.

In an embodiment, the obtaining a parameter adjustment instruction triggered in the database parameter configuration page includes: obtaining a preset performance indicator value designated in the database parameter configuration page; and generating a parameter adjustment instruction including the preset performance indicator value, the parameter adjustment instruction being used for instructing the server to determine the adjustment termination condition according to the preset performance indicator value.

Specifically, the user inputs the user account in a login page of a user terminal, logs in to a database parameter configuration page, and enters a preset performance indicator value in the database parameter configuration page. When the user terminal detects that a parameter adjustment button in the database parameter configuration page is tapped, the preset performance indicator value entered in the database parameter configuration page is obtained, a parameter adjustment instruction is generated according to the obtained preset performance indicator value, and the parameter adjustment instruction is transmitted to the server. The server receives the parameter adjustment instruction transmitted by the user terminal, parses the parameter adjustment instruction, extracts a preset performance indicator value in the parameter adjustment instruction through parsing, and uses the preset performance indicator value as the adjustment termination condition. The performance indicator value is indicator data used for representing data processing performance of a database. The performance indicator includes, for example but not limited to, throughput, time delay, memory usage, and the like.

In an embodiment, the using the new configuration parameter as a current configuration parameter, and returning to the determining a current database state indicator value corresponding to the current configuration parameter to continue execution until an adjustment termination condition is met, to obtain a recommended configuration parameter, includes: obtaining a database performance indicator value corresponding to the new configuration parameter; and using the new configuration parameter as a current configuration parameter in a case that the obtained database performance indicator value does not match a preset performance indicator value in the adjustment termination condition, or a quantity of cycles is less than a preset quantity, and returning to the determining a current database state indicator value corresponding to the current configuration parameter to continue execution until a database performance indicator value corresponding to the new configuration parameter matches the preset performance indicator value or the quantity of cycles reaches the preset quantity.

Specifically, the server configures the database by using the new configuration parameter, and accesses, according to the database access history record, the database configured by using the new configuration parameter. In the access monitoring process, the server obtains a database performance indicator value corresponding to the database configured by using the new configuration parameter. The server extracts a preset performance indicator value in the adjustment termination condition, detects whether the obtained database performance indicator value matches the extracted preset performance indicator value, if yes, terminates the adjustment, and if not, uses the new configuration parameter as the current configuration parameter, and returns to the determining a current database state indicator value corresponding to the current configuration parameter to continue cyclic execution.

In an embodiment, the server records the quantity of cycles, compares the recorded quantity of cycles with the preset quantity in the adjustment termination condition, if the recorded quantity of cycles is less than the preset quantity, uses the new configuration parameter as the current configuration parameter, and returns to the determining a current database state indicator value corresponding to the current configuration parameter to continue cyclic execution, and if the recorded quantity of cycles is equal to the preset quantity, terminates the adjustment.

In this embodiment, a server determines a current database state indicator value corresponding to a current configuration parameter according to a received parameter adjustment instruction, and generates parameter adjustment data through a parameter adjustment model according to the current database state indicator value, thereby improving accuracy of the generated parameter adjustment data. The current configuration parameter is adjusted according to the generated parameter adjustment data, to obtain a new configuration parameter, the new configuration parameter is used as a current configuration parameter, and execution of determining a current database state indicator value corresponding to the current configuration parameter is continued until the adjustment termination condition is met, to obtain the recommended configuration parameter. The current configuration parameter is adjusted continuously and automatically by using the parameter adjustment data generated by using the parameter adjustment model, to finally obtain the recommended configuration parameter when the adjustment termination condition is met, thereby improving accuracy of the recommended configuration parameter.

Figure 12:
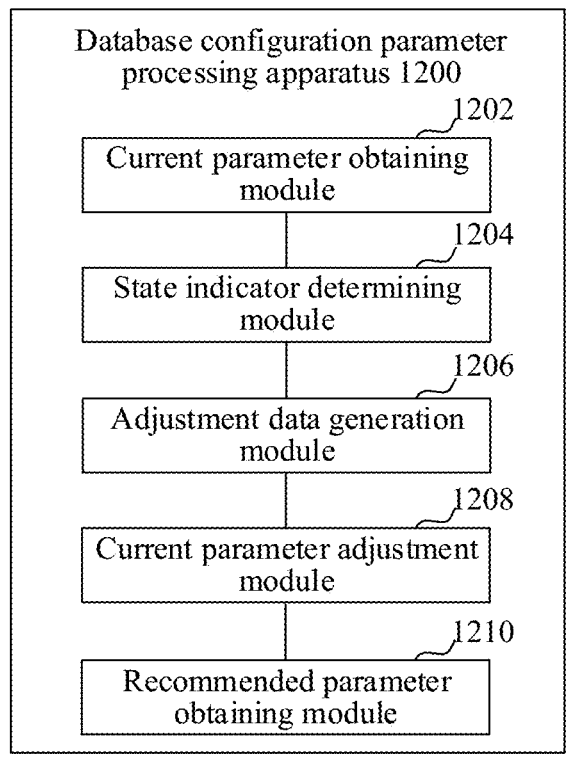
FIG. 12 is a block diagram of a database configuration parameter processing apparatus in an embodiment.

As shown in FIG. 12, in an embodiment, a database configuration parameter processing apparatus 1200 is provided. The apparatus includes a current parameter obtaining module 1202, a state indicator determining module 1204, an adjustment data generation module 1206, a current parameter adjustment module 1208, and a recommended parameter obtaining module 1210.

The current parameter obtaining module 1202 is configured to obtain a current configuration parameter.

The state indicator determining module 1204 is configured to determine a current database state indicator value corresponding to the current configuration parameter.

The adjustment data generation module 1206 is configured to generate parameter adjustment data through a parameter adjustment model according to the current database state indicator value.

The current parameter adjustment module 1208 is configured to adjust the current configuration parameter according to the parameter adjustment data, to obtain a new configuration parameter.

The recommended parameter obtaining module 1210 is configured to use the new configuration parameter as a current configuration parameter, and return to the determining a current database state indicator value corresponding to the current configuration parameter to continue execution until an adjustment termination condition is met, to obtain a recommended configuration parameter.

Figure 13:
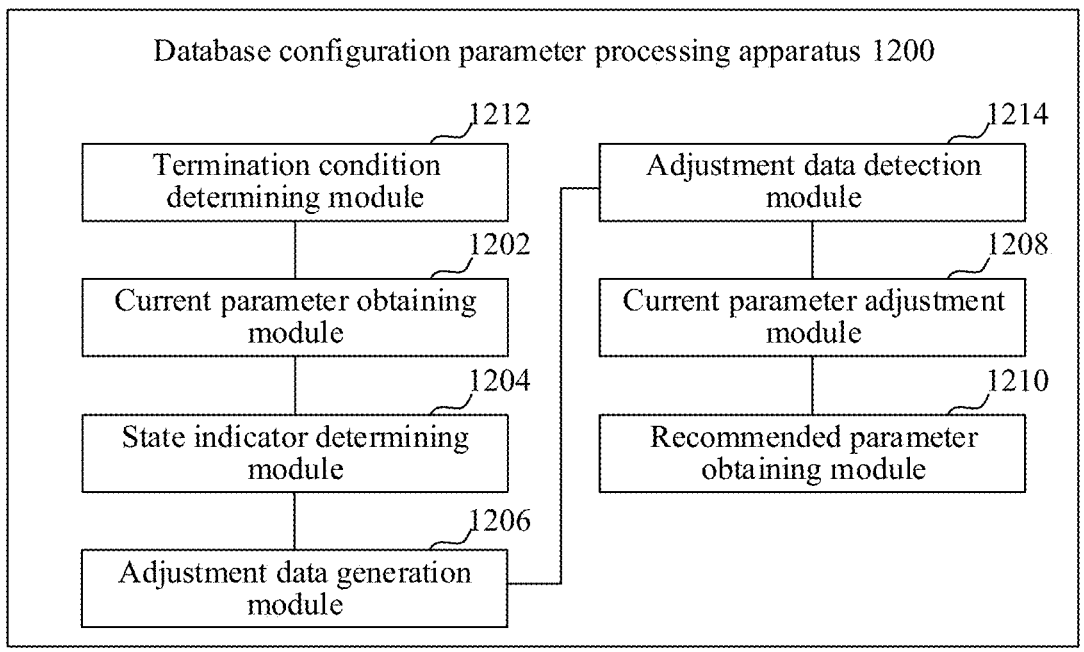
FIG. 13 is a block diagram of a database configuration parameter processing apparatus in an embodiment.

As shown in FIG. 13, in an embodiment, the database configuration parameter processing apparatus 1200 further includes: a termination condition determining module 1212 and an adjustment data detection module 1214.

The termination condition determining module 1212 is configured to receive a parameter adjustment instruction that is triggered through a user account; and determine an adjustment termination condition according to the parameter adjustment instruction.

The current parameter obtaining module 1202 is further configured to obtain a current configuration parameter corresponding to a database corresponding to the user account.

The adjustment data detection module 1214 is configured to obtain a database performance improvement value corresponding to the parameter adjustment data; generate random parameter adjustment data; determine a database performance improvement value corresponding to the random parameter adjustment data; detect whether the obtained database performance improvement value is less than the determined database performance improvement value; and update the parameter adjustment data according to the random parameter adjustment data in a case that the obtained database performance improvement value is less than the determined database performance improvement value.

In this embodiment, a database performance improvement value corresponding to parameter adjustment data generated by using a parameter adjustment model is compared with a database performance improvement value corresponding to random parameter adjustment data, and if the obtained database performance improvement value is less than the determined database performance improvement value, the configuration is adjusted according to the random parameter adjustment data. Accordingly, the database performance improvement becomes better, and the parameter adjustment data is updated according to the random parameter adjustment data, thereby improving a degree by which database performance is improved after the configuration parameter is adjusted according to the parameter adjustment data.

In an embodiment, the state indicator determining module 1204 is further configured to obtain a database access history record; access, according to the database access history record, a database configured by using the current configuration parameter; and obtain the current database state indicator value determined by accessing the database.

In this embodiment, a database configured by using a current configuration parameter is accessed by using a recorded database access history record, a current database state indicator value determined by accessing the database is obtained, to ensure that the current database state indicator value corresponding to the current configuration parameter is obtained, accuracy of the current database state indicator value is determined, and further parameter adjustment data is generated through a parameter adjustment model according to the current database state indicator value, thereby improving accuracy of the parameter adjustment data.

In an embodiment, the adjustment data generation module 1206 is further configured to adjust the current configuration parameter iteratively and determine a corresponding performance variation through the parameter adjustment model based on the current database state indicator value and the current configuration parameter; construct a performance variation accumulation value function based on each performance variation; determine a maximum performance variation accumulation value according to the constructed performance variation accumulation value function; and obtain the parameter adjustment data corresponding to the maximum performance variation accumulation value.

In this embodiment, a performance variation corresponding to each adjustment is determined by adjusting a current configuration parameter iteratively through a parameter adjustment model according to a current database state indicator value and the current configuration parameter, a performance variation accumulation value corresponding to each adjustment is determined according to each performance variation, and parameter adjustment data corresponding to a maximum performance variation accumulation value is selected, to ensure that the performance variation of the database is maximum after the current configuration parameter is adjusted according to the selected parameter adjustment data, thereby improving accuracy of parameter adjustment.

In an embodiment, the adjustment data generation module 1206 is further configured to determine predicted parameter adjustment data through the parameter adjustment model according to the current database state indicator value; adjust the current configuration parameter according to the predicted parameter adjustment data, to obtain a predicted configuration parameter; determine a predicted database state indicator value and a predicted performance indicator value that correspond to the predicted configuration parameter; determine, according to the predicted performance indicator value, the performance variation corresponding to the configuration parameter after the current adjustment; and perform an iteration by using the predicted database state indicator value as the current database state indicator value until an iteration stop condition is met.

In this embodiment, an iteration is performed through a parameter adjustment model according to a current database state indicator value, accuracy of parameter adjustment data generated by the parameter adjustment model may be improved through the iteration. Also, a configuration parameter is adjusted according to the parameter adjustment data with relatively high accuracy, to improve efficiency of obtaining a recommended configuration parameter.

In an embodiment, the adjustment data generation module 1206 is further configured to obtain a model parameter of a first neural network model in the parameter adjustment model; input the obtained model parameter into a second neural network model in the parameter adjustment model; and determine a maximum performance variation accumulation value corresponding to the constructed performance variation accumulation value function through the second neural network model.

The adjustment data generation module 1206 is further configured to perform gradient descent processing on the maximum performance variation accumulation value, to obtain a maximum estimated accumulation value matching the maximum performance variation accumulation value; and determine the parameter adjustment data corresponding to the maximum estimated accumulation value through the first neural network model.

In this embodiment, a model parameter in a first neural network model in a parameter adjustment model is input into a second neural network model, thereby ensuring consistency between the first neural network model and the second neural network model, and improving accuracy of data processing. A maximum performance variation accumulation value is determined by using the second neural network model, and a maximum estimated accumulation value is obtained by performing gradient descent on the maximum performance variation accumulation value, so that a performance variation accumulation value corresponding to the parameter adjustment data returned by the first neural network model is ensured to be maximum, thereby improving efficiency of generation of the parameter adjustment data.

In an embodiment, the adjustment data generation module 1206 is further configured to obtain a quantity of times that the current configuration parameter is adjusted in an iteration process; and determine, according to the predicted performance indicator value and the quantity of times, the performance variation corresponding to the configuration parameter after the current adjustment, the performance variation being negatively correlated to the quantity of times and being positively correlated to the predicted performance indicator value.

In an embodiment, the recommended parameter obtaining module 1210 is further configured to obtain a database performance indicator value corresponding to the new configuration parameter; and use the new configuration parameter as a current configuration parameter in a case that the obtained database performance indicator value does not match a preset performance indicator value in the adjustment termination condition, or a quantity of cycles is less than a preset quantity, and return to the determining a current database state indicator value corresponding to the current configuration parameter to continue execution until a database performance indicator value corresponding to the new configuration parameter matches the preset performance indicator value or the quantity of cycles reaches the preset quantity.

Figure 14:
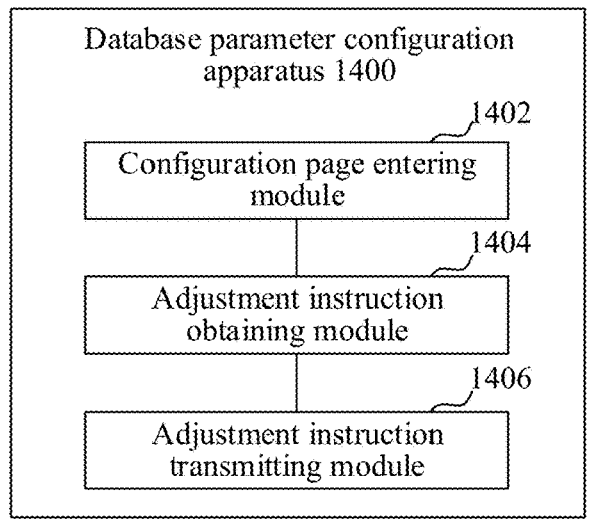
FIG. 14 is a block diagram of a database parameter configuration apparatus in an embodiment.

As shown in FIG. 14, in an embodiment, a database parameter configuration apparatus 1400 is provided. The apparatus 1400 may include a configuration page entering module 1402, an adjustment instruction obtaining module 1404, and an adjustment instruction transmitting module 1406.

The configuration page entering module 1402 is configured to enter a database parameter configuration page by using a current user account.

The adjustment instruction obtaining module 1404 is configured to obtain a parameter adjustment instruction triggered in the database parameter configuration page.

The adjustment instruction transmitting module 1406 is configured to transmit the parameter adjustment instruction to a server, the parameter adjustment instruction being used for instructing the server to obtain a current configuration parameter of a database corresponding to the user account, determine a current database state indicator value corresponding to the current configuration parameter, generate parameter adjustment data through a parameter adjustment model according to the current database state indicator value, adjust the current configuration parameter according to the parameter adjustment data, to obtain a new configuration parameter, use the new configuration parameter as a current configuration parameter, and return to the determining a current database state indicator value corresponding to the current configuration parameter to continue execution until an adjustment termination condition is met, to obtain a recommended configuration parameter.

In an embodiment, the adjustment instruction obtaining module 1404 is further configured to obtain a preset performance indicator value designated in the database parameter configuration page; and generate a parameter adjustment instruction including the preset performance indicator value, the parameter adjustment instruction being used for instructing the server to determine the adjustment termination condition according to the preset performance indicator value.

The adjustment instruction transmitting module 1406 is further configured to obtain a database performance indicator value corresponding to the new configuration parameter; and use the new configuration parameter as a current configuration parameter in a case that the obtained database performance indicator value does not match a preset performance indicator value in the adjustment termination condition, or a quantity of cycles is less than a preset quantity, and return to the determining a current database state indicator value corresponding to the current configuration parameter to continue execution until a database performance indicator value corresponding to the new configuration parameter matches the preset performance indicator value or the quantity of cycles reaches the preset quantity.

FIG. 15 is a schematic diagram of an internal structure of a computer device in an embodiment. Referring to FIG. 15, the computer device may be the server 120 shown in FIG. 1, or may be the user terminal 110 shown in FIG. 1, or may be the master server 222 in the server cluster 220 in FIG. 2, or may be the user terminal 210 in FIG. 2. The computer device includes a processor, a memory, and a network interface connected through a system bus. The memory includes a non-volatile storage medium and an internal memory. The non-volatile storage medium of the computer device may store an operating system and a computer program. When being executed, the computer program may cause the processor to perform a database configuration parameter processing method. The processor of the computer device is configured to provide computing and control capabilities, to support running of the entire computer device. The internal memory may store a computer program, the computer program, when being executed by the processor, causing the processor to perform a database configuration parameter processing method. The network interface of the computer device is configured to perform network communication.

A person skilled in the art would understand that, the structure shown in FIG. 15 is only a block diagram of a partial structure related to the solution in the disclosure, and does not constitute any limitation on the computer device or a robot to which the solution of the disclosure is applied. Specifically, the specific computer device may include more components or fewer components than those shown in the figure, or some components may be combined, or a different component deployment may be used.

In an embodiment, the database configuration parameter processing apparatus 1200 provided in the disclosure may be implemented in a form of a computer program. The computer program may be run on the computer device shown in FIG. 15. The memory of the computer device or the robot may store all program modules, for example, the current parameter obtaining module 1202, the state indicator determining module 1204, the adjustment data generation module 1206, the current parameter adjustment module 1208, and the recommended parameter obtaining module 1210 shown in FIG. 12, forming the database configuration parameter processing apparatus. A computer program formed by the program modules causes the processor to perform the operations in the database configuration parameter processing method in the embodiments of the disclosure described in this specification.

For example, the computer device shown in FIG. 15 may obtain the current configuration parameter through the current parameter obtaining module 1202 in the database configuration parameter processing apparatus 1200 shown in FIG. 12. The state indicator determining module 1204 determines the current database state indicator value corresponding to the current configuration parameter. The adjustment data generation module 1206 generates the parameter adjustment data through the parameter adjustment model according to the current database state indicator value. The current parameter adjustment module 1208 adjusts the current configuration parameter according to the parameter adjustment data, to obtain the new configuration parameter. The recommended parameter obtaining module 1210 uses the new configuration parameter as the current configuration parameter, and returns to the determining a current database state indicator value corresponding to the current configuration parameter to continue execution until the adjustment termination condition is met, to obtain the recommended configuration parameter.

A computer device, including a memory and a processor, the memory storing a computer program, the computer program, when being executed by the processor, causing the processor to perform the following operations: obtaining a current configuration parameter; determining a current database state indicator value corresponding to the current configuration parameter; generating parameter adjustment data through a parameter adjustment model according to the current database state indicator value; adjusting the current configuration parameter according to the parameter adjustment data, to obtain a new configuration parameter; using the new configuration parameter as a current configuration parameter, and returning to the determining a current database state indicator value corresponding to the current configuration parameter to continue execution until an adjustment termination condition is met, to obtain a recommended configuration parameter.

In an embodiment, when being executed by the processor, the computer program causes the processor to perform the following operations: receiving a parameter adjustment instruction that is triggered through a user account; and determining the adjustment termination condition according to the parameter adjustment instruction.

In an embodiment, the obtaining a current configuration parameter includes: obtaining a current configuration parameter corresponding to a database corresponding to the user account.

In an embodiment, the determining a current database state indicator value corresponding to the current configuration parameter includes: obtaining a database access history record; accessing, according to the database access history record, a database configured by using the current configuration parameter; and obtaining the current database state indicator value determined by accessing the database.

In an embodiment, the generating parameter adjustment data through a parameter adjustment model according to the current database state indicator value includes: adjusting the current configuration parameter iteratively and determining a corresponding performance variation through the parameter adjustment model based on the current database state indicator value and the current configuration parameter; constructing a performance variation accumulation value function based on each performance variation; determining a maximum performance variation accumulation value according to the constructed performance variation accumulation value function; and obtaining the parameter adjustment data corresponding to the maximum performance variation accumulation value.

In an embodiment, the adjusting the current configuration parameter iteratively and determining a corresponding performance variation through the parameter adjustment model based on the current database state indicator value and the current configuration parameter includes: determining predicted parameter adjustment data through the parameter adjustment model according to the current database state indicator value; adjusting the current configuration parameter according to the predicted parameter adjustment data, to obtain a predicted configuration parameter; determining a predicted database state indicator value and a predicted performance indicator value that correspond to the predicted configuration parameter; determining, according to the predicted performance indicator value, the performance variation corresponding to the configuration parameter after the current adjustment; and performing an iteration by using the predicted database state indicator value as the current database state indicator value until an iteration stop condition is met.

In an embodiment, the determining a maximum performance variation accumulation value according to the constructed performance variation accumulation value function includes: obtaining a model parameter of a first neural network model in the parameter adjustment model; inputting the obtained model parameter into a second neural network model in the parameter adjustment model; and determining the maximum performance variation accumulation value corresponding to the constructed performance variation accumulation value function through the second neural network model.

In an embodiment, the obtaining the parameter adjustment data corresponding to the maximum performance variation accumulation value includes: performing gradient descent processing on the maximum performance variation accumulation value, to obtain a maximum estimated accumulation value matching the maximum performance variation accumulation value; and determining the parameter adjustment data corresponding to the maximum estimated accumulation value through the first neural network model.

In an embodiment, the determining, according to the predicted performance indicator value, the performance variation corresponding to the configuration parameter after the current adjustment includes: obtaining a quantity of times that the current configuration parameter is adjusted in an iteration process; and determining, according to the predicted performance indicator value and the quantity of times, the performance variation corresponding to the configuration parameter after the current adjustment, the performance variation being negatively correlated to the quantity of times and being positively correlated to the predicted performance indicator value.

In an embodiment, after the generating parameter adjustment data through a parameter adjustment model according to the current database state indicator value, when being executed by the processor, the computer program causes the processor to perform the following operations: obtaining a database performance improvement value corresponding to the parameter adjustment data; generating random parameter adjustment data; determining a database performance improvement value corresponding to the random parameter adjustment data; detecting whether the obtained database performance improvement value is less than the determined database performance improvement value; updating the parameter adjustment data according to the random parameter adjustment data in a case that the obtained database performance improvement value is less than the determined database performance improvement value.

A storage medium, storing a computer program, is provided, and the computer program, when being executed by a processor, causing the processor to perform the following operations: obtaining a current configuration parameter; determining a current database state indicator value corresponding to the current configuration parameter; generating parameter adjustment data through a parameter adjustment model according to the current database state indicator value; adjusting the current configuration parameter according to the parameter adjustment data, to obtain a new configuration parameter; using the new configuration parameter as a current configuration parameter, and returning to the determining a current database state indicator value corresponding to the current configuration parameter to continue execution until an adjustment termination condition is met, to obtain a recommended configuration parameter.

When being executed by the processor, the computer program stored in the storage medium causes the processor to perform the database configuration parameter processing method, and details are not described herein again.

A person of ordinary skill in the art would understand that all or some of the processes of the methods in the foregoing embodiments may be implemented by a computer program instructing relevant hardware. The program may be stored in a non-volatile computer-readable storage medium. When the program is executed, the processes of the foregoing method embodiments may be performed. Any reference to a memory, a storage, a database, or another medium used in the embodiments provided in the disclosure can include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache. As an illustration instead of a limitation, the RAM is available in various forms, such as a static RAM (SRAM), a dynamic RAM (DRAM), a synchronous DRAM (SDRAM), a double data rate SDRAM (DDRSDRAM), an enhanced SDRAM (ESDRAM), a Synchlink DRAM (SLDRAM), a Rambus direct RAM (RDRAM), a direct Rambus dynamic RAM (DRDRAM), and a Rambus dynamic RAM (DRAM).

The technical features in the foregoing embodiments may be randomly combined. For concise description, not all possible combinations of the technical features in the embodiment are described. However, the combinations of the technical features are all to be considered as falling within the scope described in this specification provided that they do not conflict with each other.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments only show several implementations of the disclosure and are described in detail, but they are not to be construed as a limit to the patent scope of the disclosure. A person of ordinary skill in the art may further make variations and improvements without departing from the ideas of the disclosure, which shall fall within the protection scope of the disclosure. Therefore, the protection scope of the disclosure shall be subject to the protection scope of the appended claims.

What is claimed is:

1. A method of processing a database configuration parameter, performed by a computer device, the method comprising:
   (a) obtaining a current configuration parameter of a database;
   (b) determining a current database state indicator value corresponding to the current configuration parameter;
   (c) generating, by using a parameter adjustment model, parameter adjustment data based on the current database state indicator value;
   (d) adjusting the current configuration parameter based on the parameter adjustment data, to obtain a new configuration parameter;
   (e) updating the current configuration parameter to the new configuration parameter; and
   (f) repeating operations (b)-(e) until an adjustment termination condition is met, to obtain the updated current configuration parameter as a recommended configuration parameter upon adjustment termination,
   wherein the generating the parameter adjustment data comprises:
   iteratively adjusting the current configuration parameter and determining a corresponding performance variation through the parameter adjustment model based on the current database state indicator value and the current configuration parameter;
   determining a maximum performance variation accumulation value, by using a performance variation accumulation value function that is based on each performance variation, wherein a performance variation accumulation value represents a total processing performance variation of the current database after iterative adjustments; and
   obtaining the parameter adjustment data corresponding to the maximum performance variation accumulation value, and
   wherein the performance variation is expressed as follows:

$$r = \frac{(\alpha_1 p_1 + \alpha_2 p_2 + \ldots + \alpha_n p_n)q + b}{q},$$

where r represents the performance variation, q represents a quantity of times that the configuration parameter is adjusted, b is a constant, $p_1, p_2, \ldots,$ and $p_n$ respectively represent n preset indicator values, and $a_1, a_2, \ldots,$ and $a_n$ respectively represent n coefficients corresponding to the preset indicator values.

2. The method according to claim 1, further comprising:
   receiving a parameter adjustment instruction that is triggered through a user account; and
   determining the adjustment termination condition according to the parameter adjustment instruction,
   wherein the obtaining the current configuration parameter comprises:
   obtaining a current configuration parameter of a database corresponding to the user account.

3. The method according to claim 1, wherein the determining the current database state indicator value comprises:
   obtaining a database access history record;
   accessing, based on the database access history record, a database configured by using the current configuration parameter; and
   obtaining the current database state indicator value by accessing the database.

4. The method according to claim 1, wherein the iteratively adjusting the current configuration parameter and determining the corresponding performance variation comprise:
   determining predicted parameter adjustment data through the parameter adjustment model based on the current database state indicator value;
   adjusting, in a current adjustment, the current configuration parameter based on the predicted parameter adjustment data, to obtain a predicted configuration parameter;
   determining a predicted database state indicator value and a predicted performance indicator value that correspond to the predicted configuration parameter;
   determining, based on the predicted performance indicator value, a performance variation corresponding to a configuration parameter after the current adjustment; and
   performing an iteration by using the predicted database state indicator value as the current database state indicator value until an iteration stop condition is met.

5. The method according to claim 4, wherein the determining the maximum performance variation accumulation value comprises:
   obtaining a model parameter of a first neural network model in the parameter adjustment model;
   inputting the obtained model parameter into a second neural network model in the parameter adjustment model; and
   determining the maximum performance variation accumulation value by using the performance variation accumulation value function through the second neural network model, and
   wherein the obtaining the parameter adjustment data corresponding to the maximum performance variation accumulation value comprises:
   performing gradient descent processing on the maximum performance variation accumulation value, to obtain a maximum estimated accumulation value matching the maximum performance variation accumulation value; and
   determining the parameter adjustment data corresponding to the maximum estimated accumulation value through the first neural network model.

6. The method according to claim 4, wherein the determining the performance variation comprises:
   obtaining a quantity of times that the current configuration parameter is adjusted in the iteration; and
   determining, based on the predicted performance indicator value and the quantity of times, the performance variation corresponding to the configuration parameter after the current adjustment, the performance variation being negatively correlated to the quantity of times and being positively correlated to the predicted performance indicator value.

7. The method according to claim 1, further comprising, after the generating the parameter adjustment data:
   obtaining a database performance improvement value corresponding to the parameter adjustment data;
   generating random parameter adjustment data;

determining a database performance improvement value corresponding to the random parameter adjustment data;
detecting whether the obtained database performance improvement value is less than the determined database performance improvement value; and
updating the parameter adjustment data according to the random parameter adjustment data based on the obtained database performance improvement value being less than the determined database performance improvement value.

8. The method according to claim 1, wherein the updating comprises:
obtaining a database performance indicator value corresponding to the new configuration parameter; and
based on the obtained database performance indicator value not matching a preset performance indicator value in the adjustment termination condition, or based on a quantity of cycles being less than a preset quantity, updating the current configuration parameter to the new configuration parameter.

9. An apparatus for processing a database configuration parameter, the apparatus comprising:
at least one memory configured to store program code; and
at least one processor configured to read the program code and operate as instructed by the program code, the program code comprising:
current parameter obtaining code configured to cause at least one of the at least one processor to obtain a current configuration parameter of a database;
state indicator determining code configured to cause at least one of the at least one processor to determine a current database state indicator value corresponding to the current configuration parameter;
adjustment data generation code configured to cause at least one of the at least one processor to, by using a parameter adjustment model, generate parameter adjustment data based on the current database state indicator value;
current parameter adjustment code configured to cause at least one of the at least one processor to adjust the current configuration parameter based on the parameter adjustment data, to obtain a new configuration parameter; and
recommended parameter obtaining code configured to cause at least one of the at least one processor to update the current configuration parameter to the new configuration parameter, and cause operations of the state indicator determining code, the adjustment data generation code, and the current parameter adjustment code to be performed until an adjustment termination condition is met, to obtain the updated current configuration parameter as a recommended configuration parameter upon adjustment termination,
wherein the adjustment data generation code further causes at least one of the at least one processor to:
iteratively adjust the current configuration parameter and determine a corresponding performance variation through the parameter adjustment model based on the current database state indicator value and the current configuration parameter;
determine a maximum performance variation accumulation value, by using a performance variation accumulation value function that is based on each performance variation, wherein a performance variation accumulation value represents a total processing performance variation of the current database after iterative adjustments; and
obtain the parameter adjustment data corresponding to the maximum performance variation accumulation value, and
wherein the performance variation is expressed as follows:

$$r = \frac{(\alpha_1 p_1 + \alpha_2 p_2 + \ldots + \alpha_n p_n)q + b}{q}$$

where r represents the performance variation, q represents a quantity of times that the configuration parameter is adjusted, b is a constant, $p_1, p_2, \ldots,$ and $p_n$ respectively represent n preset indicator values, and $a_1, a_2, \ldots,$ and $a_n$ respectively represent n coefficients corresponding to the preset indicator values.

10. An apparatus for configuring a database parameter, the apparatus comprising:
at least one memory configured to store program code; and
at least one processor configured to read the program code and operate as instructed by the program code, the program code comprising:
configuration code configured to cause at least one of the at least one processor to enter a database parameter configuration page by using a user account;
adjustment instruction obtaining code configured to cause at least one of the at least one processor to obtain a parameter adjustment instruction triggered in the database parameter configuration page; and
adjustment instruction transmitting code configured to cause at least one of the at least one processor to transmit the parameter adjustment instruction to a server, the parameter adjustment instruction being used, in the server, to obtain a current configuration parameter of a database corresponding to the user account, determine a current database state indicator value corresponding to the current configuration parameter, generate parameter adjustment data through a parameter adjustment model based on the current database state indicator value, adjust the current configuration parameter based on the parameter adjustment data, to obtain a new configuration parameter, update the current configuration parameter to the new configuration parameter,
wherein generation of the parameter adjustment data in the server comprises:
iteratively adjusting the current configuration parameter and determining a corresponding performance variation through the parameter adjustment model based on the current database state indicator value and the current configuration parameter;
determining a maximum performance variation accumulation value, by using a performance variation accumulation value function that is based on each performance variation, wherein a performance variation accumulation value represents a total processing performance variation of the current database after iterative adjustments; and
obtaining the parameter adjustment data corresponding to the maximum performance variation accumulation value, and wherein the performance variation is expressed as follows:

$$r = \frac{(\alpha_1 p_1 + \alpha_2 p_2 + \ldots + \alpha_n p_n)q + b}{q}$$

where r represents the performance variation, q represents a quantity of times that the configuration parameter is adjusted, b is a constant, $p_1$,— $p_2$, . . . , and $p_n$ respectively represent n preset indicator values, and $a_1$ $a_2$, . . . , and $a_n$ respectively represent n coefficients corresponding to the preset indicator values.

11. The apparatus according to claim 9, wherein the program code further comprises:
reception code configured to cause at least one of the at least one processor to receive a parameter adjustment instruction that is triggered through a user account; and
determination code configured to cause at least one of the at least one processor to determine the adjustment termination condition based on the parameter adjustment instruction, and
wherein the current parameter obtaining code further causes at least one of the at least one processor to:
obtain a current configuration parameter of a database corresponding to the user account.

12. The apparatus according to claim 9, wherein the state indicator determining code further causes at least one of the at least one processor to:
obtain a database access history record;
access, based on the database access history record, a database configured by using the current configuration parameter; and
obtain the current database state indicator value by accessing the database.

13. The apparatus according to claim 9, wherein the adjustment data generation code further causes at least one of the at least one processor to:
determine predicted parameter adjustment data through the parameter adjustment model based on the current database state indicator value;
adjust, in a current adjustment, the current configuration parameter based on the predicted parameter adjustment data, to obtain a predicted configuration parameter;
determine a predicted database state indicator value and a predicted performance indicator value that correspond to the predicted configuration parameter;
determine, based on the predicted performance indicator value, the performance variation corresponding to a configuration parameter after the current adjustment; and
perform an iteration by using the predicted database state indicator value as the current database state indicator value until an iteration stop condition is met.

14. The apparatus according to claim 13, wherein the adjustment data generation code further causes at least one of the at least one processor to:
obtain a model parameter of a first neural network model in the parameter adjustment model;
inputting the obtained model parameter into a second neural network model in the parameter adjustment model; and
determine the maximum performance variation accumulation value corresponding to the performance variation accumulation value function through the second neural network model, and wherein the adjustment data generation code further causes at least one of the at least one processor to obtain the parameter adjustment data corresponding to the maximum performance variation accumulation value by:
performing gradient descent processing on the maximum performance variation accumulation value, to obtain a maximum estimated accumulation value matching the maximum performance variation accumulation value; and
determining the parameter adjustment data corresponding to the maximum estimated accumulation value through the first neural network model.

15. The apparatus according to claim 13, wherein the adjustment data generation code further causes at least one of the at least one processor to:
obtain a quantity of times that the current configuration parameter is adjusted in the iteration; and
determine, based on the predicted performance indicator value and the quantity of times, the performance variation corresponding to the configuration parameter after the current adjustment, the performance variation being negatively correlated to the quantity of times and being positively correlated to the predicted performance indicator value.

16. The apparatus according to claim 9, wherein the program code further comprises:
obtaining code configured to cause at least one of the at least one processor to obtain a database performance improvement value corresponding to the parameter adjustment data;
generation code configured to cause at least one of the at least one processor to generate random parameter adjustment data;
determination code configured to cause at least one of the at least one processor to determine a database performance improvement value corresponding to the random parameter adjustment data;
detection code configured to cause at least one of the at least one processor to detect whether the obtained database performance improvement value is less than the determined database performance improvement value; and
updating code configured to cause at least one of the at least one processor to update the parameter adjustment data based on the random parameter adjustment data based on the obtained database performance improvement value being less than the determined database performance improvement value.

17. The apparatus according to claim 9, wherein the recommended parameter obtaining code further causes at least one of the at least one processor to:
obtain a database performance indicator value corresponding to the new configuration parameter; and
based on the obtained database performance indicator value not matching a preset performance indicator value in the adjustment termination condition, or based on a quantity of cycles being less than a preset quantity, updating the current configuration parameter to the new configuration parameter.

18. A non-transitory storage medium, storing a computer program, the computer program, when being executed by a processor, causing the processor to perform operations of the method according to claim 1.

* * * * *